(12) United States Patent
Hino

(10) Patent No.: US 10,449,846 B2
(45) Date of Patent: *Oct. 22, 2019

(54) TRANSMISSION, CONTROL DEVICE, AND VEHICLE

(71) Applicant: YAMAHA HATSUDOKI KABUSHIKI KAISHA, Iwata-shi, Shizuoka (JP)

(72) Inventor: Haruyoshi Hino, Iwata (JP)

(73) Assignee: YAMAHA HATSUDOKI KABUSHIKI KAISHA, Iwata-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,569

(22) Filed: May 5, 2017

(65) Prior Publication Data

US 2017/0240053 A1    Aug. 24, 2017

Related U.S. Application Data

(63) Continuation-in-part of application No. PCT/JP2015/082930, filed on Nov. 24, 2015.

(30) Foreign Application Priority Data

Nov. 25, 2014 (JP) .................. 2014-237372
Oct. 2, 2015 (JP) .................. 2015-196667
(Continued)

(51) Int. Cl.
*B60L 11/08* (2006.01)
*B60K 1/02* (2006.01)
(Continued)

(52) U.S. Cl.
CPC .................. *B60K 1/02* (2013.01); *B60K 1/00* (2013.01); *B60K 6/20* (2013.01); *B60K 6/26* (2013.01);
(Continued)

(58) Field of Classification Search
CPC ........ B60L 11/08; H02K 1/27; H02K 21/028; H02P 9/40; H02M 7/44
See application file for complete search history.

(56) References Cited

U.S. PATENT DOCUMENTS 3,229,138 A * 1/1966 Kober .................. H02K 21/028
310/209
5,763,977 A * 6/1998 Shimasaki ........... H02K 21/024
310/162
(Continued)

FOREIGN PATENT DOCUMENTS

CN  1762086 A  4/2006
CN  1836962 A  9/2006
(Continued)

*Primary Examiner* — Sean Gugger
(74) *Attorney, Agent, or Firm* — Rabin & Berdo, P.C.

(57) ABSTRACT

A transmission for outputting a rotational torque in accordance with a torque requirement. The transmission includes a generator, a motor and a control device. The generator includes a rotor configured to receive first rotational power from an engine, a stator including a stator core with a winding wound thereon, a magnetic circuit for the winding passing through the stator core, and a supply current adjustment device configured to adjust magnetic resistance of the magnetic circuit for the winding, to thereby change an inductance of the winding to adjust a current outputted by the generator. The motor is driven by the current outputted from the generator, to thereby output second rotational power. The control device controls the supply current adjustment device to change the inductance of the winding, in accordance with the torque requirement.

24 Claims, 9 Drawing Sheets

(30) Foreign Application Priority Data

| Oct. 2, 2015 | (JP) | 2015-196668 |
|---|---|---|
| Oct. 2, 2015 | (JP) | 2015-196669 |
| Oct. 2, 2015 | (JP) | 2015-196670 |

(51) Int. Cl.

| H02K 21/24 | (2006.01) |
|---|---|
| H02P 9/04 | (2006.01) |
| H02K 1/27 | (2006.01) |
| H02K 21/02 | (2006.01) |
| H02P 9/40 | (2006.01) |
| H02M 7/44 | (2006.01) |
| H02P 9/14 | (2006.01) |
| B60K 1/00 | (2006.01) |
| B60K 6/20 | (2007.10) |
| B60K 6/26 | (2007.10) |
| B60W 20/50 | (2016.01) |
| G07C 5/00 | (2006.01) |
| G07C 5/08 | (2006.01) |
| H02K 7/18 | (2006.01) |
| B60W 20/19 | (2016.01) |
| B60W 10/06 | (2006.01) |
| B60W 10/08 | (2006.01) |
| B60W 20/00 | (2016.01) |
| H02K 7/00 | (2006.01) |
| B60L 50/10 | (2019.01) |
| B60L 50/13 | (2019.01) |
| B60L 50/14 | (2019.01) |
| B60L 50/61 | (2019.01) |
| B60K 6/24 | (2007.10) |
| B60K 6/48 | (2007.10) |
| H02P 101/45 | (2016.01) |
| B60K 6/34 | (2007.10) |
| B60K 6/46 | (2007.10) |
| H02P 27/06 | (2006.01) |
| H02P 101/25 | (2016.01) |

(52) U.S. Cl.

CPC .............. *B60L 50/10* (2019.02); *B60L 50/13* (2019.02); *B60L 50/14* (2019.02); *B60L 50/61* (2019.02); *B60W 10/06* (2013.01); *B60W 10/08* (2013.01); *B60W 20/00* (2013.01); *B60W 20/19* (2016.01); *B60W 20/50* (2013.01); *G07C 5/006* (2013.01); *G07C 5/008* (2013.01); *G07C 5/0825* (2013.01); *H02K 1/27* (2013.01); *H02K 7/006* (2013.01); *H02K 7/1815* (2013.01); *H02K 21/021* (2013.01); *H02K 21/026* (2013.01); *H02K 21/028* (2013.01); *H02K 21/029* (2013.01); *H02K 21/24* (2013.01); *H02M 7/44* (2013.01); *H02P 9/04* (2013.01); *H02P 9/14* (2013.01); *H02P 9/40* (2013.01); *B60K 6/24* (2013.01); *B60K 6/34* (2013.01); *B60K 6/46* (2013.01); *B60K 6/48* (2013.01); *B60K 2001/001* (2013.01); *B60L 2220/14* (2013.01); *B60L 2220/50* (2013.01); *B60L 2240/429* (2013.01); *B60W 2300/365* (2013.01); *B60W 2510/083* (2013.01); *B60W 2520/105* (2013.01); *B60W 2710/0644* (2013.01); *B60W 2710/08* (2013.01); *B60W 2710/083* (2013.01); *B60W 2720/106* (2013.01); *B60Y 2200/92* (2013.01); *H02P 27/06* (2013.01); *H02P 2101/25* (2015.01); *H02P 2101/45* (2015.01); *Y02T 10/6217* (2013.01); *Y02T 10/641* (2013.01); *Y02T 10/642* (2013.01); *Y02T 10/7005* (2013.01); *Y02T 10/7077* (2013.01); *Y10S 903/905* (2013.01); *Y10S 903/906* (2013.01); *Y10S 903/93* (2013.01)

(56) References Cited

U.S. PATENT DOCUMENTS

| 6,057,622 | A | * | 5/2000 | Hsu | H02K 21/046 |
| | | | | | 310/155 |
| 6,072,258 | A | * | 6/2000 | Lamb | H02K 49/046 |
| | | | | | 310/103 |
| 6,943,531 | B2 | | 9/2005 | Fukaya | |
| 7,064,454 | B2 | | 6/2006 | Fukaya et al. | |
| 7,204,011 | B2 | | 4/2007 | Maslov | |
| 8,288,982 | B2 | | 10/2012 | Kauppi | |
| 8,761,981 | B2 | | 6/2014 | Hussain et al. | |
| 2002/0170757 | A1 | | 11/2002 | Kitada et al. | |
| 2002/0193923 | A1 | | 12/2002 | Toyama et al. | |
| 2006/0152104 | A1 | | 7/2006 | Hino et al. | |
| 2007/0029887 | A1 | * | 2/2007 | Murota | H02K 7/116 |
| | | | | | 310/98 |
| 2007/0096581 | A1 | * | 5/2007 | Zepp | H02K 21/024 |
| | | | | | 310/191 |
| 2007/0227792 | A1 | * | 10/2007 | Yonemori | B60K 6/26 |
| | | | | | 180/65.31 |
| 2009/0134723 | A1 | * | 5/2009 | Takeuchi | H02K 21/026 |
| | | | | | 310/48 |
| 2009/0206602 | A1 | * | 8/2009 | Nakamura | H02K 7/12 |
| | | | | | 290/43 |
| 2009/0212728 | A1 | | 8/2009 | Yagi et al. | |
| 2010/0131139 | A1 | | 5/2010 | Sakai et al. | |
| 2011/0121676 | A1 | | 5/2011 | Zhu et al. | |
| 2011/0133592 | A1 | | 6/2011 | Hino et al. | |
| 2011/0202219 | A1 | | 8/2011 | Ishibashi | |
| 2011/0246010 | A1 | | 10/2011 | de la Torre Bueno | |
| 2012/0126740 | A1 | * | 5/2012 | Kauppi | H02K 21/028 |
| | | | | | 318/538 |
| 2012/0197472 | A1 | | 8/2012 | He et al. | |
| 2013/0096745 | A1 | | 4/2013 | Hussain et al. | |
| 2013/0127244 | A1 | | 5/2013 | Handa | |

FOREIGN PATENT DOCUMENTS

| CN | 103503277 A | 1/2014 |
| EP | 1132251 A1 | 9/2001 |
| EP | 1615319 A1 | 1/2006 |
| EP | 1705784 A2 | 9/2006 |
| EP | 1859985 A2 | 11/2007 |
| EP | 1993187 A1 | 11/2008 |
| JP | 2002-345109 A | 11/2002 |
| JP | 2003-306183 A | 10/2003 |
| JP | 2006-271040 A | 10/2006 |
| JP | 2007-195334 A | 8/2007 |
| JP | 2008-048519 A | 2/2008 |
| JP | 2008-285011 A | 11/2008 |
| JP | 2009-195051 A | 8/2009 |
| JP | 2009-225656 A | 10/2009 |
| JP | 2011-092008 A | 5/2011 |
| JP | 2012-044792 A | 3/2012 |
| JP | 2013-180645 A | 9/2013 |
| JP | 2014-084034 A | 5/2014 |
| JP | 2014-108673 A | 6/2014 |
| TW | M358746 U1 | 6/2009 |
| TW | I345539 B1 | 7/2011 |
| TW | M421259 U1 | 1/2012 |
| TW | M421388 U1 | 1/2012 |
| TW | 2013-15627 A | 4/2013 |
| TW | I401858 B1 | 7/2013 |
| WO | WO 2014-054069 A1 | 4/2014 |

\* cited by examiner

TRANSMISSION, CONTROL DEVICE, AND VEHICLE

CROSS-REFERENCE TO RELATED APPLICATIONS

This is a continuation-in-part application of International Application PCT/JP2015/082930, filed on Nov. 24, 2015, which is based on, and claims priority to, Japanese Patent Application No. 2014-237372, filed on Nov. 25, 2014, and Japanese Patent Application Nos. 2015-196667, 2015-196668, 2015-196669 and 2015-196670, all filed on Oct. 2, 2015, the contents of which are incorporated herein by reference.

TECHNICAL FIELD

The present invention relates to a transmission, a control device, and a vehicle.

BACKGROUND ART

Conventionally known is the following transmission. In the transmission, a rotational output (rotational power) of an engine is converted into electric power by a generator. The electric power resulting from the conversion is converted into rotational power by a motor. The rotational power resulting from the conversion is supplied to a rotating mechanism.

For example, Japanese Patent Application Laid-Open No. 2002-345109 ("JPA'109") shows a vehicle. The vehicle shown in JPA'109 is a hybrid vehicle. This vehicle includes an engine, an accelerator pedal, a first rotary electric machine, a second rotary electric machine, and a drive wheel. The first rotary electric machine is coupled to an output shaft of the engine. The first rotary electric machine functions mainly as a generator. The second rotary electric machine is electrically connected to the first rotary electric machine. The second rotary electric machine functions mainly as a motor. A set of the first and second rotary electric machines is used as a transmission machine. By a current flowing in the first rotary electric machine and the second rotary electric machine, power running is performed. The second rotary electric machine is coupled to the drive wheel of the vehicle.

In the vehicle as shown in JPA'109, a depression of the accelerator pedal depressed by a driver represents a request for acceleration of the vehicle. The vehicle as shown in JPA'109 is, if provided with an electronic-controlled throttle device, able to optionally adjust the amount of air taken in by the engine. The vehicle is, therefore, controlled in the following manner, for example. A target output of the second rotary electric machine (motor) is determined based on the vehicle speed and the amount of depression of the accelerator pedal depressed by the driver. A target electric power to be generated by the first rotary electric machine (generator) is determined in accordance with the target output of the second rotary electric machine. A target output of the engine is determined in accordance with the target electric power to be generated. The amount of air taken in and the amount of fuel injected by the engine are controlled so as to achieve the target output. In this control, the first rotary electric machine is controlled in its generating electric power and the second rotary electric machine is controlled in its output. In a case where the vehicle as shown in JPA'109 is configured with its accelerator pedal mechanically coupled with its engine throttle, the electric power generated by the first rotary electric machine and the output of the second rotary electric machine are controlled in accordance with an actual output of the engine. In JPA'109, as described above, electric power (output) of the rotary electric machine is controlled so as to allow applications to various types of vehicles with different characteristics.

BRIEF SUMMARY OF THE INVENTION

The vehicle as shown in JPA'109 controls the amount of air taken in and the amount of fuel injected by the engine, in order to control the torque of the drive wheel. The vehicle as shown in JPA'109 increases the amount of air taken in and the amount of fuel injected by the engine, in order to increase the torque of the drive wheel. A situation requiring an increase of the torque of the drive wheel occurs in accelerating the vehicle, for example. As the amount of air taken in and the amount of fuel injected by the engine increase, the rotation speed of the engine increases. That is, rotational power outputted from the engine increases. As a result, a current outputted from the first rotary electric machine that functions as a generator increases, so that a current supplied to the second rotary electric machine increases. The increase of the current supplied to the second rotary electric machine causes an increase of the torque outputted from the second rotary electric machine to the drive wheel. Here, there has been a problem that the current outputted from the generator is less readily increased than the rotation speed of the generator is.

In the vehicle as shown in JPA'109, therefore, an attempt to increase a power generation current for the purpose of increasing the torque outputted from the second rotary electric machine requires an excessive increase of the output power of the engine. This may decrease the fuel efficiency. Dealing with the voltage, which increases in response to the increase of the output power of the engine, may also decrease the fuel efficiency.

The present invention provides a transmission, a control device, and a vehicle, capable of enlarging a torque adjustment range with suppression of a decrease in fuel efficiency of the engine.

In various embodiments, the present invention adopts the following configurations:

(1) A transmission configured to vary a rotational torque and a rotation speed outputted from an engine and supply the varied rotational torque and rotation speed to a rotating mechanism, the transmission comprising:

a generator that outputs electric power according to rotational power transmitted from the engine, the generator including a rotor, a stator, and a supply current adjustment device, the rotor including a permanent magnet, the rotor rotated by the rotational power transmitted from the engine, the stator arranged opposite to the rotor, the stator including a winding and a stator core with the winding wound thereon, the supply current adjustment device configured to adjust a current to be outputted from the generator, the adjustment implemented by changing an inductance of the winding, the change implemented by changing a magnetic resistance of a magnetic circuit for the winding, which passes through the stator core;

a motor that is driven by the electric power outputted from the generator, and outputs rotational power to the rotating mechanism; and a control device that controls the supply current adjustment device in accordance with a torque requirement of the transmission, to direct the supply current adjustment device to adjust the current to be outputted from the generator by changing the inductance of the winding, the torque requirement requesting a torque to be outputted from the transmission to the rotating mechanism.

In the transmission of (1), the rotor of the generator is rotated by the rotational power transmitted from the engine. At this time, a magnetic flux of the permanent magnet included in the rotor acts on the winding. This generates an induced voltage. The induced voltage causes electric power to be outputted. The generator outputs electric power according to the rotational power transmitted from the engine. The motor is driven by the electric power outputted from the generator, to output rotational power.

In the transmission of (1), the control device controls the supply current adjustment device in accordance with the torque requirement of the transmission, the torque requirement requesting a torque to be outputted to the rotating mechanism. The supply current adjustment device adjusts the current to be outputted from the generator by changing the inductance of the winding. A rotational torque to be outputted from the motor to the rotating mechanism is adjusted accordingly.

In the generator, the magnetic resistance of the magnetic circuit for the winding, which passes through the stator core, is changed so that the inductance is changed. The ratio of a current change to a voltage change obtained when changing the magnetic resistance of the magnetic circuit for the winding, which passes through the stator core, is different from that obtained when changing the output of the engine.

The control device controls the current of the generator by controlling the supply current adjustment device in accordance with the torque requirement requesting a torque to be outputted to the rotating mechanism. This can suppress an excessive increase of the rotational power of the engine. The control device is also able to adjust the torque to be outputted to the rotating mechanism while ensuring a balance between the voltage and the electric power generated in the generator. Accordingly, the transmission of (1) is capable of enlarging a torque adjustment range with suppression of a decrease in fuel efficiency of the engine.

(2) The transmission of (1), further comprising a motor power control device provided in an electric power supply path between the generator and the motor, the motor power control device configured to control electric power to be supplied to the motor, wherein
the control device controls both the motor power control device and the supply current adjustment device.

In the configuration of (2), the control device is able to control the electric power to be supplied to the motor, independently of controlling the output of the generator. For example, even while the engine and the generator are operating, the motor can be brought into a stopped state by the motor power control device stopping the supply of the electric power to the motor. Accordingly, the configuration of (2) provides an increased degree of freedom in terms of controlling the rotation outputted from the motor.

(3) The transmission of (1), wherein
the engine includes an output adjustment device that adjusts rotational power to be outputted from the engine, and
the control device cooperates with the output adjustment device to direct the supply current adjustment device to adjust the current to be outputted from the generator by changing the inductance of the winding.

In the configuration of (3), the control device cooperates with the output adjustment device to adjust the current to be outputted from the generator. Thus, the current to be supplied from the generator to the motor can be adjusted with suppression of an excessive increase of the rotational power of the engine. Accordingly, the configuration of (3) is able to adjust the torque with suppression of a decrease in fuel efficiency of the engine.

(4) The transmission of any one of (1) to (3), wherein
the magnetic circuit for the winding, which passes through the stator core, includes at least one non-magnetic gap, and
the supply current adjustment device adjusts the current to be outputted from the generator, the adjustment implemented by changing the inductance of the winding, the change implemented by changing a magnetic resistance of a non-magnetic gap being among the at least one non-magnetic gap, the non-magnetic gap existing between the winding and the rotor.

In the configuration of (4), the supply current adjustment device changes the inductance of the winding by changing the magnetic resistance of the non-magnetic gap existing between the winding and the rotor. The permanent magnet moving along with rotation of the rotor causes an alternating magnetic field to occur between the winding and the rotor. For example, reducing the magnetic resistance of the non-magnetic gap existing between the winding and the rotor leads to a reduction of an alternating magnetic field loss. This can increase the current relative to the rotational power supplied to the rotor. Accordingly, the current to be outputted from the generator can be adjusted to an increased degree.

(5) The transmission of any one of (1) to (4), wherein
the magnetic circuit for the winding, which passes through the stator core, includes at least one non-magnetic gap, and
the supply current adjustment device adjusts the current to be outputted from the generator, the adjustment implemented by changing the inductance of the winding, the change implemented by changing a magnetic resistance of a non-magnetic gap being among the at least one non-magnetic gap, the non-magnetic gap whose magnetic resistance being highest when the inductance of the winding is set to the highest settable value.

The configuration of (5) changes the magnetic resistance of the non-magnetic gap whose magnetic resistance is highest when the inductance of the winding is set to the highest settable value. This makes it easy to increase the amount of change of the inductance of the winding. Accordingly, the current can be adjusted to an increased degree.

(6) The transmission of any one of (1) to (5), wherein
the supply current adjustment device adjusts the current to be outputted from the generator, the adjustment implemented by changing the inductance of the winding such that the change rate of a magnetic flux linked with the winding is lower than the change rate of the inductance of the winding, the change implemented by changing the magnetic resistance of the magnetic circuit for the winding, which passes through the stator core.

In the configuration of (6), the supply current adjustment device changes the inductance of the winding such that the change rate of the magnetic flux linked with the winding is lower than the change rate of the inductance of the winding. The magnetic flux linked with the winding is influential to the voltage and current. The inductance of the winding is influential mainly to the current. The supply current adjustment device is, therefore, able to adjust the supply current with the change rate of the voltage being lower than the change rate of the current. That is, the supply current adjustment device is able to adjust the current while less influenced by voltage constraints. Accordingly, the configuration of (6) is capable of enlarging a torque adjustment range with further suppression of a decrease in fuel efficiency of the engine.

(7) The transmission of any one of (1) to (6), wherein
the supply current adjustment device adjusts the current to be outputted from the generator, the adjustment implemented by changing the inductance of the winding, the change implemented by changing the magnetic resistance of the magnetic circuit for the winding, which passes through the stator core, the change of the magnetic resistance implemented by moving the position of at least a portion of the stator core relative to the winding.

In the configuration of (7), the supply current adjustment device changes the magnetic resistance of the magnetic circuit for the winding, which passes through the stator core, the change implemented by moving the position of at least a portion of the stator core relative to the winding. The inductance of the winding can be changed easily. That is, the current to be supplied to the motor is readily adjustable. Accordingly, the torque to be outputted from the motor is readily adjustable.

(8) The transmission of (7), wherein
the supply current adjustment device adjusts the current to be outputted from the generator, the adjustment implemented by changing the inductance of the winding, the change implemented by changing the magnetic resistance of the magnetic circuit for the winding, which passes through the stator core, the change of the magnetic resistance implemented by moving the position of the stator core relative to the winding while maintaining the position of the stator core relative to the rotor.

The configuration of (8) moves the position of the stator core relative to the winding while maintaining the position of the stator core relative to the rotor. This can suppress a change of the magnetic flux that flows from the permanent magnet of the rotor to the stator core. That is, a change of the magnetic flux generated by the permanent magnet and linked with the winding is suppressed. As a result, a change of the voltage is suppressed which otherwise might be caused by movement of the position of the stator core relative to the winding. Accordingly, the configuration of (8) is capable of enlarging a torque adjustment range with further suppression of a decrease in fuel efficiency of the engine.

(9) The transmission of any one of (1) to (7), wherein
the supply current adjustment device adjusts the current to be outputted from the generator, the adjustment implemented by changing the inductance of the winding, the change implemented by changing the magnetic resistance of the magnetic circuit for the winding, which passes through the stator core, the change of the magnetic resistance implemented by moving the winding.

The configuration of (9) moves the position of the winding relative to the stator core while maintaining the position of the stator core relative to the rotor. This can suppress a change of the magnetic flux that flows from the permanent magnet of the rotor to the stator core. That is, a change of the magnetic flux generated by the permanent magnet and linked with the winding is suppressed. As a result, a change of the voltage is suppressed which otherwise might be caused by movement of the position of the stator core relative to the winding. Accordingly, the configuration of (9) is capable of enlarging a torque adjustment range with further suppression of a decrease in fuel efficiency of the engine.

(10) The transmission of any one of (1) to (4), wherein
the generator includes a supply voltage adjustment device that adjusts a voltage to be outputted from the generator, the adjustment implemented by changing an induced voltage of the winding, the change implemented by changing a linkage flux flowing from the permanent magnet of the rotor and linked with the winding.

The configuration of (10) is able to adjust the voltage outputted from the generator in a way other than by the engine output adjustment device adjusting the rotational power. This provides an increased degree of freedom in terms of controlling the rotation, with suppression of a decrease in fuel efficiency of the engine.

(11) The transmission of (10), wherein
the supply voltage adjustment device adjusts the voltage to be outputted from the generator, the adjustment implemented by changing the induced voltage of the winding, the change implemented by changing the linkage flux generated from the permanent magnet of the rotor and linked with the winding, the change of the linkage flux implemented by moving the position of the permanent magnet relative to the winding.

The configuration of (11) makes it easy to adjust the voltage to be outputted from the generator. It is therefore easy to provide an increased degree of freedom in terms of controlling the rotation.

(12) The transmission of any one of (1) to (4), wherein
the stator core includes a plurality of first stator core parts and a second stator core part, each of the plurality of first stator core parts having a facing portion that is opposite to the rotor with a non-magnetic gap therebetween, the second stator core part not having the facing portion, and the supply current adjustment device changes the magnetic resistance of the magnetic circuit for the winding, which passes through the stator core, the change implemented by moving one of the plurality of first stator core parts and the second stator core part relative to the other.

In the configuration of (12), the supply current adjustment device moves one of the plurality of first stator core parts and the second stator core part included in the stator core relative to the other. Such a configuration provides a larger change of the magnetic resistance of the magnetic circuit for the winding, which passes through the stator core, as compared with a configuration in which, for example, one of the stator core and a member different from the stator core is moved relative to the other. Thus, the current to be supplied to the motor can be adjusted over a wider range in accordance with the torque requirement. Accordingly, the configuration of (9) is capable of further enlarging the torque adjustment range with further suppression of a decrease in fuel efficiency of the engine.

(13) The transmission of (12), wherein
the supply current adjustment device changes the magnetic resistance of the magnetic circuit for the winding, which passes through the stator core, the change implemented by moving one of the plurality of first stator core parts and the second stator core part relative to the other so as to shift from a first state to a second state, the first state being a state in which the length of a non-magnetic gap between each of the plurality of first stator core parts and the second stator core part is shorter than the length of a non-magnetic gap between adjacent ones of the plurality of first stator core parts, the second state being a state in which the length of the non-magnetic gap between each of the plurality of first stator core parts and the second stator core part is longer than the length of the non-magnetic gap between adjacent ones of the plurality of first stator core parts.

In the configuration of (13), in the first state, the length of the non-magnetic gap between each of the plurality of first stator core parts and the second stator core part is shorter than the length of the non-magnetic gap between adjacent ones of the plurality of first stator core parts. In the second state, the length of the non-magnetic gap between each of the plurality of first stator core parts and the second stator core part is longer than the length of the non-magnetic gap between adjacent ones of the plurality of first stator core parts.

In the first state, therefore, a portion of the magnetic flux generated by the current in the winding, which portion flows through the non-magnetic gap between the adjacent first stator core parts, mostly flows through the non-magnetic gap between the first stator core part and the second stator core part. That is, the magnetic flux generated by the current in the winding mostly flows through both the first stator core parts and the second stator core part. In the second state, the magnetic resistance of the magnetic circuit passing through the first stator core part is higher. A greater change of the magnetic resistance of the magnetic circuit for the winding, which passes through the stator core, is obtained. Accordingly, the configuration of (13) is capable of further enlarging the torque adjustment range with further suppression of a decrease in fuel efficiency.

(14) A control device for use in the transmission of any one of (1) to (13),
the control device comprising:
a torque request receiving device configured to receive a torque request for the transmission, the torque request requesting a torque to be outputted from the transmission to the rotating mechanism; and
an adjustment control device that controls the supply current adjustment device configured to adjust the current by changing the inductance of the winding, in accordance with the torque request received by the torque request receiving device.

The control device of (14) is capable of enlarging the torque adjustment range in the transmission with suppression of a decrease in fuel efficiency of the engine.

(15) A vehicle comprising:
the transmission of any one of (1) to (13);
an engine that supplies rotational power to the transmission; and
a rotational drive mechanism serving as the rotating mechanism, the rotational drive mechanism supplied with rotational power to drive the vehicle, the rotational power having a torque and a rotation speed varied by the transmission.

In the vehicle of (15), the requirement for the torque to be outputted from the transmission varies depending on the status of traveling of the vehicle. If an increase of the torque is required, the transmission is able to respond to the requirement for increasing the torque with suppression of a decrease in fuel efficiency of the engine. Accordingly, the vehicle of (15) is capable of enlarging a torque adjustment range with suppression of a decrease in fuel efficiency of the engine.

Advantageous Effects of Invention

The present invention is capable of enlarging a torque adjustment range with suppression of a decrease in fuel efficiency of the engine.

DETAILED DESCRIPTION OF THE INVENTION

Figure 1:
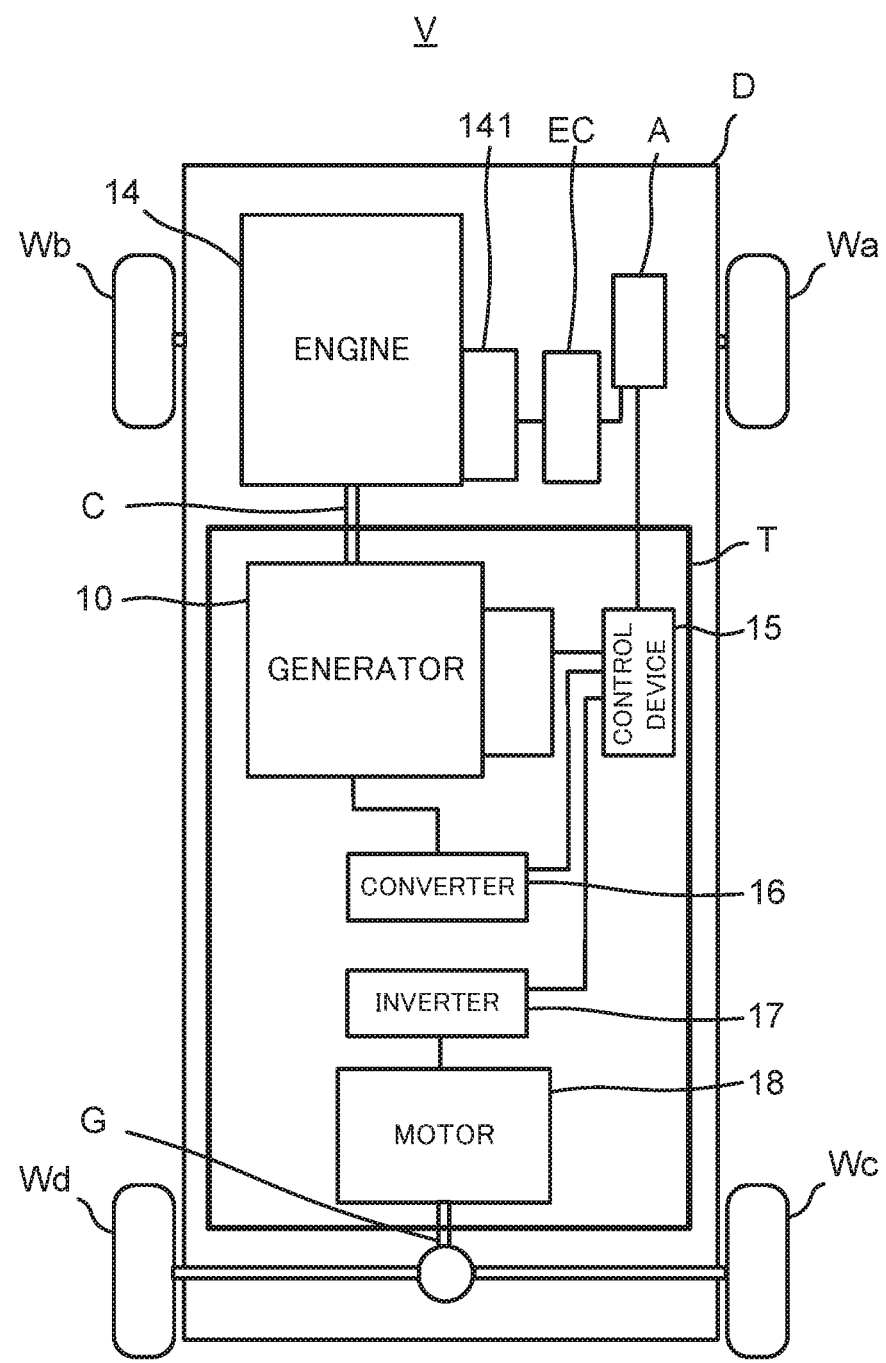
FIG. 1 is a block diagram showing an outline configuration of an apparatus having mounted thereon a transmission according to a first embodiment of the present invention.

A description will be given of studies conducted by the present inventor about a transmission that varies the rotational torque and the rotation speed of an engine and supplies the varied rotational torque and rotation speed to a rotating mechanism.

When, for example, the vehicle as shown in JPA'109 travels at a high speed, the second rotary electric machine serving as the motor needs to rotate at a high speed. This requires a high voltage to be supplied to the second rotary electric machine. For this purpose, the vehicle increases the amount of air taken in and the amount of fuel injected by the engine. In this manner, the vehicle increases the voltage supplied from the first rotary electric machine serving as the generator to the second rotary electric machine.

When, for example, the vehicle as shown in JPA'109 travels uphill, the second rotary electric machine serving as the motor needs to output a high torque. This requires a large current to be supplied to the second rotary electric machine. For this purpose, the vehicle increases the amount of air taken in and the amount of fuel injected by the engine. In this manner, the vehicle increases the voltage outputted from the generator. An increase of a power generation voltage causes an increase of a power generation current of the generator.

The power generation current flows in a winding. The power generation current is impeded by the impedance of the winding. The impedance can be expressed as the product $\omega L$ of the inductance of the winding of the generator and the angular velocity of rotation. As the rotation speed of the engine increases, the impedance of the winding which impedes the power generation current increases.

In the vehicle as shown in JPA'109, therefore, an attempt to increase the power generation current of the generator for the purpose of increasing the output torque of the motor results in a greater increase of the rotational power of the engine as compared with an increase of the power generation current. This can increase a loss.

In the vehicle as shown in JPA'109, moreover, an attempt to increase the power generation current of the generator for the purpose of increasing the output torque of the motor results in a greater increase of the voltage of the generator as compared with an increase of the power generation current. An electrical component connected thereto needs to have a high breakdown voltage. An output current of the generator is precisely controlled by, for example, turning on/off switching elements that are arranged between the generator and a motor. The switching elements having a high breakdown voltage for withstanding the increased voltage have a high on-resistance. This leads to a decrease in efficiency due to a heat loss of the switching elements.

Hence, the vehicle shown in JPA'109 causes a decrease in fuel efficiency.

The present inventor made further studies on the above-described problems. As a result, the present inventor discovered that the reason why the above-described problems occur in the vehicle as shown in JPA'109 is that the output of the generator is controlled without distinction between the current and voltage so that the current and the voltage are highly interactive with each other.

For solving the above-described problems, the present inventor further made intensive studies.

It has been believed that an increase of a current outputted from a generator is caused mainly by an increase of a voltage, and this is not unique to the vehicle as shown in JPA'109. A voltage is increased by, for example, an increase of the rotation speed, an increase of a magnetic force, or an increase of the number of turns of a winding. A current reaches saturation as the rotation speed increases due to an armature reaction. The increase of the magnetic force or the increase of the number of turns of the winding leads to a size increase.

One conceivable way to increase the current outputted from the generator is reducing the armature reaction which is caused by an inductance. It however has been considered that reducing the inductance of a winding leads to reducing a linkage flux, which makes it difficult to increase the current.

The present inventor focused on a magnetic circuit. A magnetic circuit that influences the inductance is a magnetic circuit for a winding. The magnetic circuit for a winding is different from a magnetic circuit that extends from a magnet of a rotor and passes through a winding. The studies conducted by the present inventor were based on clear distinction between the magnetic circuit for a winding and the magnetic circuit that extends from a magnet of a rotor and passes through a winding. The present inventor consequently discovered that a large change of the inductance can be implemented by changing the magnetic resistance of the magnetic circuit for a winding.

As a consequence, the present inventor obtained the following findings: in a transmission, adjusting a current by changing the inductance of a winding of a generator can reduce interaction between the current and voltage.

The transmission of the present invention is accomplished based on the findings above. In the transmission of the present invention, a control device controls a supply current adjustment device. The supply current adjustment device changes the magnetic resistance of a magnetic circuit for a winding, which passes through a stator core, in accordance with a torque requirement requesting a torque to be outputted to a rotating mechanism. In this manner, the supply current adjustment device changes the inductance of the winding, to adjust a current to be supplied to an electrical load device. The ratio of a current change to a voltage change obtained when changing the magnetic resistance of the magnetic circuit for the winding, which passes through the stator core, is higher than that obtained when changing the rotation speed of an engine. Accordingly, the transmission of the present invention is able to adjust the current to be supplied to a motor with less interaction between the voltage change and the current change as compared with when, for example, not changing the inductance. That is, the transmission is able to adjust the output torque of the transmission with less interaction between the voltage change and the current change. The transmission is therefore able to increase the output torque without causing an excessive increase of rotational power of the engine. The transmission is also able to increase the output torque of the transmission without causing an excessive increase of the power generation voltage. This leads to an improvement in the fuel efficiency of the engine. Also, an excessive increase of the voltage is suppressed. This allows adoption of a switching element having a low breakdown voltage. The switching element with a low breakdown voltage has a low resistance when it is ON. A heat loss is suppressed, and therefore a high efficiency can be obtained. Accordingly, a fuel efficiency of the engine is improved.

As described above, the transmission of the present invention is capable of enlarging a torque adjustment range with suppression of a decrease in fuel efficiency of the engine. In addition, the transmission of the present invention is compatible to both an engine with a wide rotation speed range and an engine with a narrow rotation speed range.

In the following, the present invention will be described based on preferred embodiments and with reference to the drawings.

First Embodiment

FIG. 1 is a block diagram showing an outline configuration of an apparatus having mounted thereon a transmission T according to a first embodiment of the present invention.

FIG. 1 shows a vehicle V as an example of the apparatus having mounted thereon the transmission T. The vehicle V includes the transmission T and a vehicle body D. The vehicle body D of the vehicle V includes an engine 14, wheels Wa, Wb, Wc, Wd, a requirement indication device A, and an engine control device EC.

The transmission T is connected to drive wheels Wc, Wd among the wheels Wa to Wd. The drive wheels Wc, Wd are connected to the transmission T via a transmission mechanism G. The engine 14 and the transmission T drive the drive wheels Wc, Wd in rotation so that the vehicle V travels.

The drive wheels Wc, Wd represent one example of the rotational drive mechanism of the vehicle according to the present invention. The rotational drive mechanism represents one example of the rotating mechanism of the present invention.

The engine 14 is an internal combustion engine. The engine 14 causes fuel combustion. Thus, the engine 14 outputs mechanical power. The engine 14 includes an output shaft C. The output shaft C is, for example, a crankshaft.

As for power transmission from the engine 14 to the drive wheels Wc, Wd, the engine 14 is not connected to the drive wheels Wc, Wd by any mechanical component.

The engine 14 does not directly drive the drive wheels Wc, Wd by the rotational power of the engine 14. Therefore, the control of the rotational power of the engine 14 is less influenced by constraints inherent in operation characteristics of the drive wheels Wc, Wd. This provides a high degree of freedom in terms of controlling the rotational power of the engine 14.

The engine 14 includes an engine output adjustment device 141. The engine output adjustment device 141 adjusts the rotational power of the engine 14. The engine output adjustment device 141 includes a throttle valve adjustment mechanism and a fuel injection device (not shown). The throttle valve adjustment mechanism adjusts the amount of air taken in by the engine 14. The fuel injection device supplies a fuel to the engine 14. The engine output adjustment device 141 controls the amount of air taken in and the amount of fuel injected by the engine 14. In this manner, the engine output adjustment device 141 adjusts the rotational power outputted from the engine 14. For example, the engine output adjustment device 141 increases the amount of air taken in and the amount of fuel injected by the engine 14. This causes an increase of the rotational power of the engine 14. As the rotational power of the engine 14 increases, the rotation speed of the output shaft C increases. The rotation speed of the output shaft C represents the rotation speed of the engine 14.

The engine control device EC controls the engine output adjustment device 141. The engine output adjustment device 141 adjusts the rotational power of the engine 14 under control of the engine control device EC.

The transmission T is a mechanism that transmits rotational power outputted from the engine 14 to the drive wheels Wc, Wd serving as the rotating mechanism. The transmission T receives a supply of rotational power, and outputs the rotational power.

The transmission T is mechanically connected to the engine 14 via the output shaft C of the engine 14 such that rotational power is transmitted from the engine 14 to the transmission T. The transmission T is mechanically connected to the drive wheels Wc, Wd via the transmission mechanism G such that rotational power is transmitted to the drive wheels Wc, Wd. The transmission T includes a generator 10, a control device 15, a converter 16, an inverter 17, and a motor 18. The transmission T varies the rotational torque and the rotation speed outputted from the engine 14, and supplies the varied ones to the drive wheels Wc, Wd. Details of the transmission T will be given later.

The request indication device A outputs a torque requirement. The request indication device A has an accelerator operator.

More specifically, the request indication device A is operated by a driver of the vehicle V. The request indication device A outputs a request for acceleration of the vehicle V based on the operation and the status of traveling of the vehicle V. The request for acceleration of the vehicle V corresponds to a requirement of a torque outputted from the transmission T. The output of the vehicle V corresponds to an output of the motor 18. The request for acceleration of the vehicle V corresponds to a request for an output torque of the motor 18. The output torque of the motor 18 corresponds to a current supplied to the motor 18. Therefore, the output torque of the motor 18 corresponds to a current outputted from the generator 10.

The request indication device A outputs a torque request as an acceleration request, the torque request requesting a torque outputted from the transmission T.

The torque request requesting a torque outputted from the transmission T corresponds to a current request requesting a current supplied from the generator 10 to the motor 18.

In this embodiment, the request indication device A outputs the torque request and a speed request. For example, in a situation mainly requiring acceleration of the vehicle, an increase of the torque to be outputted to the drive wheels Wc, Wd is required. For example, in a situation mainly requiring an increase of the traveling speed of the vehicle, an increase of the rotation speed to be outputted to the drive wheels Wc, Wd is required.

The request indication device A is connected to the engine control device EC and the transmission T. To be specific, the request indication device A outputs a signal representing the request to the engine control device EC and the transmission T. The engine control device EC and the transmission T cooperate with each other.

Here, it may be possible that the request indication device A is connected to the transmission T via the engine control device EC. In such a configuration, the transmission T receives the torque request via the engine control device EC.

[Transmission]

Figure 2:
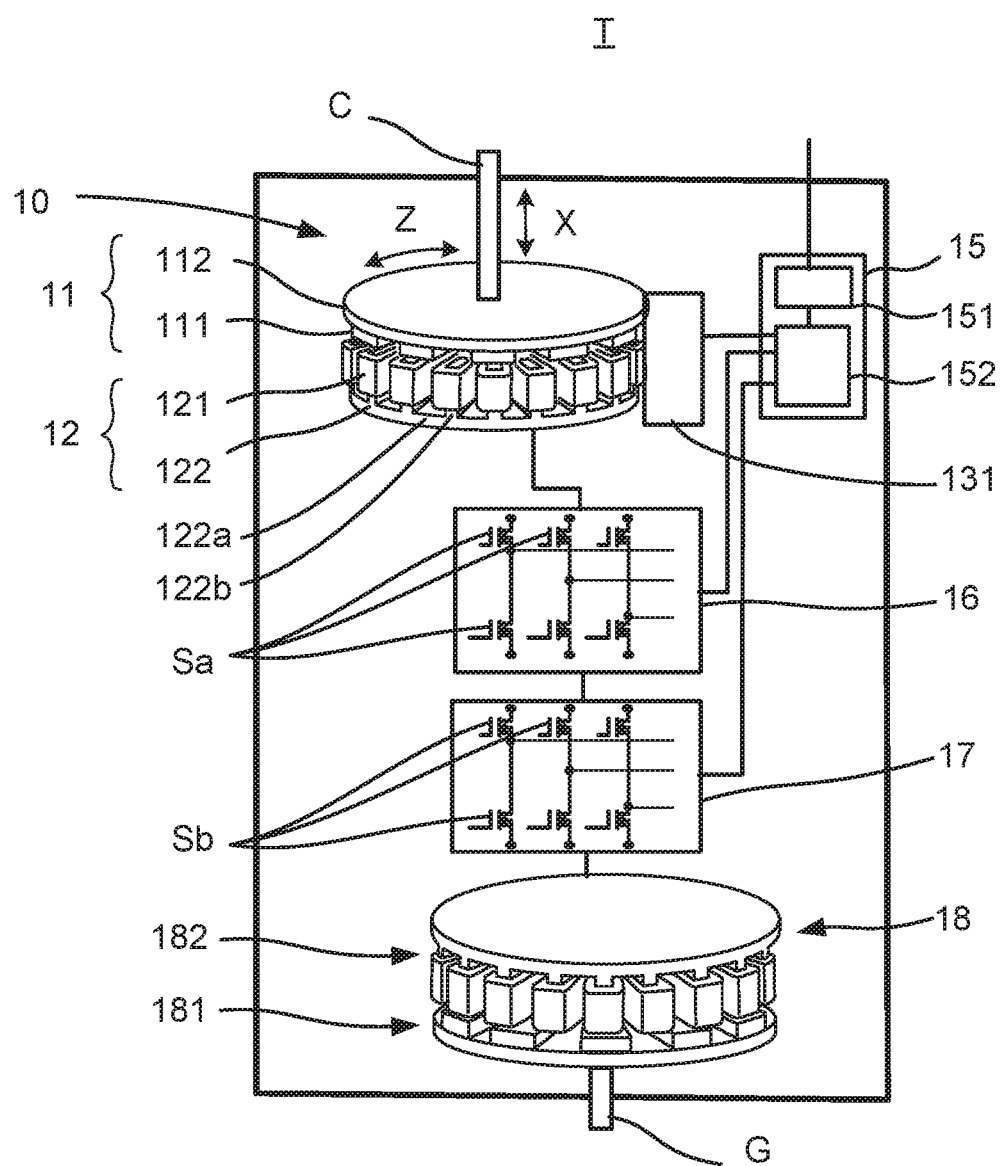
FIG. 2 is a system configuration diagram showing an outline configuration of the transmission shown in FIG. 1.

FIG. 2 is a system configuration diagram showing an outline configuration of the transmission T shown in FIG. 1.

The transmission T includes the generator 10, the control device 15, the converter 16, the inverter 17, and the motor 18.

The generator 10 receives rotational power from the engine 14, and supplies a current to the motor 18.

As for power transmission from the engine 14 to the generator 10, the generator 10 is mechanically connected to the engine 14. The generator 10 is connected to the output shaft C of the engine 14. The generator 10 is directly connected to the output shaft C. For example, the generator 10 may be attached to a crank case (not shown) of the engine 14. Alternatively, for example, the generator 10 may be arranged in a position distant from the crank case (not shown).

The generator 10 includes a rotor 11, a stator 12, and a supply current adjustment device 131.

The generator 10 is a three-phase brushless generator. The rotor 11 and the stator 12 constitute a three-phase brushless generator.

The rotor 11 includes permanent magnets. To be more specific, the rotor 11 includes a plurality of magnetic pole parts 111 and a back yoke part 112. The magnetic pole part 111 is made of a permanent magnet. The back yoke part 112 is made of, for example, a ferromagnetic material. The magnetic pole parts 111 are arranged between the back yoke part 112 and the stator 12. The magnetic pole parts 111 are attached to the back yoke part 112. The plurality of magnetic pole parts 111 are arranged so as to align in a circumferential direction Z about the rotation axis of the rotor 11, that is, so as to align in the direction of rotation of the rotor 11. The plurality of magnetic pole parts 111 are arranged such that N-poles and S-poles alternate with respect to the circumferential direction Z. The generator 10 is a three-phase brushless generator of permanent magnet type. A winding for supplying a current is not provided on the rotor 11.

The stator 12 is arranged opposite to the rotor 11. The stator 12 includes a plurality of windings 121 and a stator core 122. The stator core 122 is made of, for example, a ferromagnetic material. The stator core 122 forms a magnetic circuit of the stator 12. The plurality of windings 121 are wound on the stator core 122. The stator core 122 includes a core main body 122a (see FIGS. 3A and 3B) and a plurality of teeth 122b. The core main body 122a functions as a yoke. The plurality of teeth 122b extend from the core main body 122a toward the rotor 11. The plurality of teeth 122b protrude from the core main body 122a toward the rotor 11. The teeth 122b extending toward the rotor 11 have their distal end surfaces opposite to the magnetic pole parts 111 of the rotor 11 with an air gap therebetween. The teeth 122b of the stator core 122 and the magnetic pole parts 111 of the rotor 11 directly face each other. The plurality of teeth 122b, which are arranged at intervals with respect to the circumferential direction Z, align in the circumferential direction Z. Each of the plurality of windings 121 is wound on each of the plurality of teeth 122b. Each winding 121 is wound so as to pass through a slot between the plurality of teeth 122b. Each winding 121 corresponds to any of the three phases, namely, U-phase, V-phase, and W-phase. The windings 121 corresponding to U-phase, V-phase, and W-phase are arrange in order in the circumferential direction Z.

The rotor 11 is connected to the output shaft C of the engine 14. The rotor 11 is rotated along with rotation of the output shaft C. The rotor 11 has the magnetic pole parts 111 rotating in a state where the magnetic pole parts 111 are opposite to the teeth 122b of the stator core 122. As the rotor 11 rotates, magnetic fluxes linked with the windings 121 change. As a result, an induced voltage is generated in the windings 121. This is how the generator 10 performs power generation. The generator 10 supplies a generated current to the motor 18. The current outputted from the generator 10 is supplied to the motor 18. To be specific, the current outputted from the generator 10 is supplied to the motor 18 via the converter 16 and the inverter 17. As the current outputted from the generator 10 increases, a current supplied from the converter 16 to the inverter 17 increases, so that a current supplied to the motor 18 increases. A voltage outputted from the generator 10 is supplied to the motor 18 via the converter 16 and the inverter 17.

In this embodiment, the rotor 11 and the stator 12 have an axial gap structure. The rotor 11 and the stator 12 are opposite to each other with respect to the direction (axial direction) X of the rotation axis of the rotor 11. The plurality of teeth 122b included in the stator 12 protrude in the axial direction X from the core main body 122a. In this embodiment, the axial direction X is a direction in which the rotor 11 and the stator 12 are opposite to each other.

The supply current adjustment device 131 adjusts the current to be supplied from the generator 10 to the motor 18. For adjusting the current to be supplied to the motor 18, the supply current adjustment device 131 changes the inductance of the winding 121. The supply current adjustment device 131 changes the magnetic resistance of a magnetic circuit for the winding 121. The magnetic circuit for the winding 121 is a magnetic circuit that passes through the stator core 122. In this manner, the supply current adjustment device 131 changes the inductance of the winding 121. The supply current adjustment device 131 is a current adjustment mechanism. The magnetic circuit for the winding 121 is, for example, a close-loop circuit. The magnetic circuit for the winding 121 is a circuit that passes through an internal path of the winding 121, then goes out from one end portion (the end portion close to the rotor) of the internal path of the winding 121, then enters one end portion (the end portion close to the rotor) of an internal path of an adjacent winding 121, then passes through the internal path of the adjacent winding 121, then goes out from the other end portion (the end portion remote from the rotor) of the internal path of the adjacent winding 121, and then enters the other end portion (the end portion remote from the rotor) of the internal path of the winding 121. The internal path of the winding 121 is a path provided within the winding 121 so as to extend in the direction in which the rotor 11 and the stator 12 are opposite to each other. The magnetic circuit for the winding 121 partially has a non-magnetic gap such as an air gap. The magnetic circuit for the winding is, for example, made up of the stator core 122 and a non-magnetic gap.

Details of the adjustment of the inductance made by the supply current adjustment device 131 will be given later.

The converter 16 and the inverter 17 are provided in an electric power supply path between the generator 10 and the motor 18. The converter 16 is connected to the generator 10. The inverter 17 is connected to the converter 16 and the motor 18. Electric power outputted from the generator 10 is supplied through the converter 16 and the inverter 17 to the motor 18.

The converter 16 rectifies the current outputted from the generator 10. The converter 16 converts a three-phase AC outputted from the generator 10 into a DC. The converter 16 outputs the DC. The converter 16 has an inverter circuit, for example. The converter 16 has a three-phase bridge inverter circuit, for example. The three-phase bridge inverter circuit includes switching elements Sa corresponding to the respective three phases. On/off operations of the switching elements Sa are controlled based on a signal supplied from a position sensor (not shown) that detects the rotation position of the rotor 11.

The operation of the converter 16 is controlled by the control device 15. For example, the converter 16 changes the timing for turning on/off the switching elements Sa relative to a predetermined phase angle in the three-phase AC. In this manner, the converter 16 can adjust the current to be supplied to the motor 18. This is how the converter 16 adjusts the electric power to be supplied to the motor 18.

The adjustment made by the converter 16 is mainly for limiting the current generated by the generator 10. The adjustment made by the converter 16 is different from controlling the current by changing the inductance of the generator 10. The following description will be given under the assumption that the limiting of the current made by the converter 16 is minimum.

It is also possible that the converter 16 has a bridge circuit including diodes. That is, the converter 16 may be configured as a rectifier. In such a case, the converter 16 performs only rectification without performing the control of the current.

The motor 18 is operated by electric power that is supplied from the generator 10. The motor 18 drives the drive wheels Wc, Wd in rotation. Thus, the motor 18 makes the vehicle V travel. As for power transmission, the motor 18 is not mechanically connected to the generator 10.

The motor 18 is, for example, a three-phase brushless motor. The motor 18 includes a rotor 181 and a stator 182. The rotor 181 and the stator 182 of the motor 18 of this embodiment have the same structure as that of the rotor 11 and the stator 12 of the generator 10.

In the transmission T of this embodiment, the generator 10 is electrically connected to the motor 18. It is therefore not necessary to arrange a mechanical power transmission between the generator 10 and the motor 18. This provides a high degree of freedom in terms of arrangement of the generator 10 and the motor 18. For example, it is possible that the generator 10 is provided in the engine 14 while the motor 18 is arranged near the drive wheels Wc, Wd serving as the rotating mechanism.

The rotor and the stator of the motor 18 may be configured differently from those of the generator 10. For example, the number of magnetic poles or the number of teeth of the motor 18 may be different from those of the generator 10. For example, an induction motor or a stepper motor may be adopted as the motor 18. For example, a DC motor with brushes may be adopted as the motor 18.

The motor 18 is mechanically connected to the drive wheels Wc, Wd such that rotational power is transmitted to the drive wheels Wc, Wd. The motor 18 is mechanically connected to the drive wheels Wc, Wd via the transmission mechanism G. More specifically, the rotor 181 of the motor 18 is connected to the transmission mechanism G. A portion of the rotor 181 connected to the transmission mechanism G functions as a rotational output device of the transmission T.

An output of the motor 18 is an output of the transmission T. A request for an output of the transmission T, which means a request for an output of the motor 18, varies depending on the status of traveling of the vehicle V. For example, a situation is assumed in which a request for gently increasing the traveling speed is issued when the vehicle V is traveling on a flat terrain at a constant speed. In this case, the degree of acceleration is low, and thus the amount of increase of the output torque required of the motor 18 is relatively small. While the motor 18 is rotating at a constant speed, an induced voltage according to the rotation speed is generated in the motor 18. The induced voltage is generated so as to impede the current that is supplied to the motor 18 for driving the motor 18. Therefore, the current supplied to the motor 18 is relatively small. To respond to the request for gently increasing the traveling speed, an increase of the voltage supplied to the motor 18 is required.

On the other hand, a situation is assumed in which a sudden acceleration or uphill traveling of the vehicle V is requested. This requires a relatively large amount of increase of the output torque of the motor 18. In this case, the amount of increase of the current supplied to the motor 18 needs to be large.

The inverter 17 supplies the current for driving the motor 18 to the motor 18. The inverter 17 is supplied with a DC from the converter 16. The inverter 17 converts the DC outputted from the converter 16 into a three-phase current with phases shifted by 120 degrees. The phases of the three-phase current correspond to the three phases of the three-phase brushless motor, respectively. The inverter 17 has an inverter circuit, for example. The inverter 17 has a three-phase bridge inverter circuit, for example. The three-phase bridge inverter circuit includes switching elements Sb each corresponding to each of the three phases. The switching elements Sb are controlled based on a signal supplied from a position sensor (not shown) that detects the rotation position of the rotor 181.

The inverter 17 adjusts on/off operations of the switching elements Sb, to control the voltage to be supplied to the motor 18. For example, the inverter 17 turns on the switching elements Sb based on a pulse-width-modulated signal. The control device 15 adjusts the duty cycle of ON/OFF. Thus, the voltage to be supplied to the motor 18 is controlled to an arbitrary value by the control device 15. This is how the inverter 17 adjusts the electric power to be supplied to the motor 18.

Each of the inverter 17 and the converter 16 represents one example of the motor power control device of the present invention.

The control device 15 controls the inverter 17. Thus, the control device 15 is able to control the voltage to be supplied to the motor 18 independently of controlling the output of the generator 10. For example, even while the engine 14 and the generator 10 are operating, the control device 15 is able to bring the motor 18 into a stopped state by stopping the supply of the voltage to the motor 18. This provides an increased degree of freedom in terms of controlling the output of the transmission T.

The adjustment made by the inverter 17 is different from controlling the current by changing the inductance of the generator 10. The adjustment made by the inverter 17 is implemented so as to limit the voltage supplied from the generator 10. The following description will be given under the assumption that the limiting of the current made by the inverter 17 is kept minimum.

The inverter 17 may be included in the motor 18. In a case where a DC motor is adopted as the motor 18, the inverter 17 is not provided.

The control device 15 controls a torque to be outputted from the transmission T, in accordance with a torque request requesting a torque to be outputted to the drive wheels Wc, Wd. In this embodiment, both the control device 15 and the engine control device EC (see FIG. 1) receive the torque request. The control device 15 cooperates with the engine control device EC. More specifically, both the control device 15 and the engine control device EC receive a signal representing the torque request from the request indication device A. The control device 15 and the engine control device EC communicate with each other.

The control device 15 controls the torque to be outputted from the motor 18. In more detail, the control device 15 controls the current to be supplied from the generator 10 to the motor 18. Upon a requirement for increasing the torque, the control device 15 performs a control so as to increase the current to be supplied to the motor 18.

The control device 15 is connected to the supply current adjustment device 131 of the generator 10. The control device 15 controls the supply current adjustment device 131 in accordance with the torque request outputted from the request indication device A.

The control device 15 also controls the converter 16 and the inverter 17.

The control device 15 includes a torque request receiving device 151 and an adjustment control device 152.

The control device 15 is constituted of a microcontroller. The control device 15 includes a central processing unit (not shown) and a storage device (not shown). The central processing unit performs computational processing based on a control program. The storage device stores data concerning programs and computation. The torque request receiving device 151 and the adjustment control device 152 are implemented by the central processing unit executing programs.

The torque request receiving device 151 receives a torque request. The torque request receiving device 151 receives the torque request from the request indication device A.

The adjustment control device 152 controls the supply current adjustment device 131. Thus, the supply current adjustment device 131 controls the current to be supplied to the motor 18.

If the torque request received by the torque request receiving device 151 is a request for increasing the torque to be outputted from the transmission T to the drive wheels Wc, Wd, the adjustment control device 152 performs the control so as to increase the current to be supplied to the motor 18. That is, to increase the output power of the motor 18, the adjustment control device 152 performs the control so as to increase the current to be supplied to the motor 18.

[Supply Current Adjustment Device]

Figure 3A:
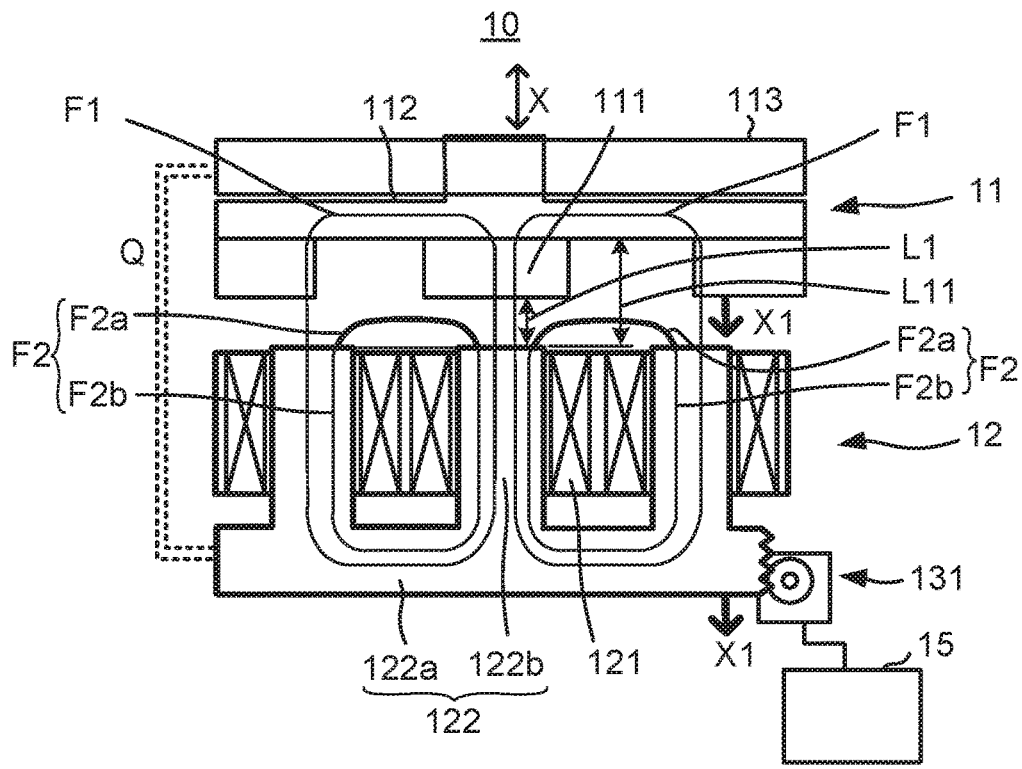
FIG. 3A is a schematic diagram for explanation of adjustment made by a supply current adjustment device included in a generator shown in FIG. 2.
Figure 3B:
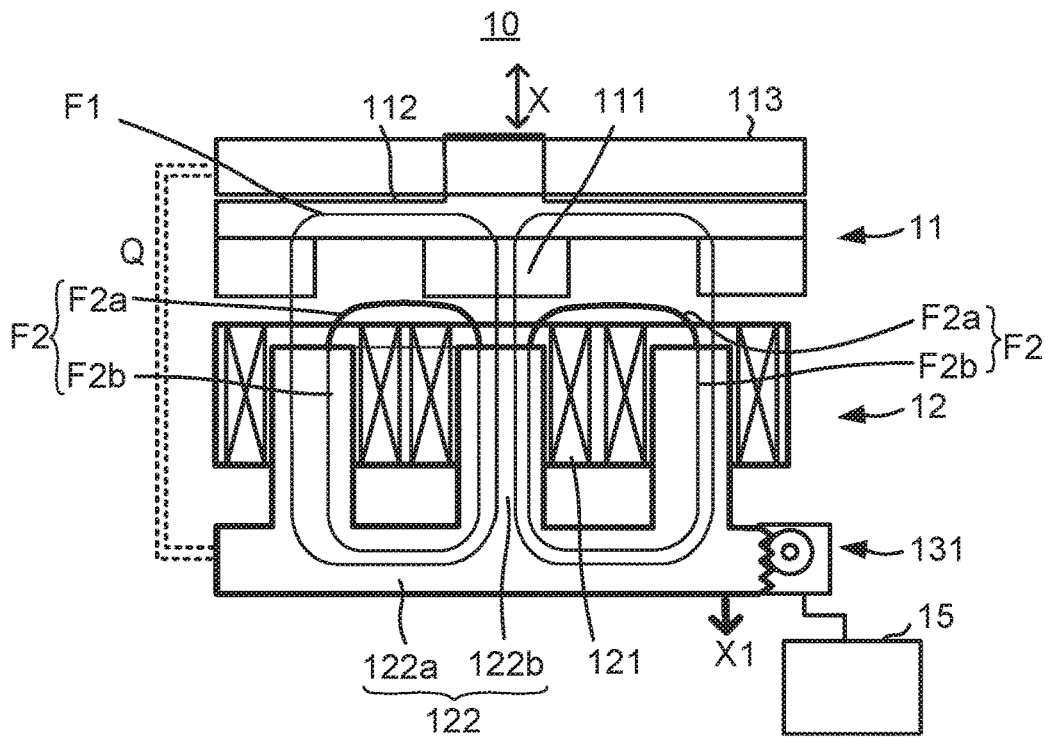
FIG. 3B is a schematic diagram showing a state in which the inductance of a winding is set lower than that of FIG. 3A.

FIG. 3A and FIG. 3B are schematic diagrams for explanation of adjustment made by the supply current adjustment device 131 provided in the generator 10 shown in FIG. 2.

FIG. 3A shows a state in which the inductance of the winding 121 is set to the highest settable value. FIG. 3B shows a state in which the inductance of the winding 121 is set to a value lower than that of FIG. 3A.

FIG. 3A illustrates a part of the rotor 11 and a part of the stator 12 provided in the generator 10. The generator 10 of this embodiment includes an SPM (Surface Permanent Magnet) generator. The rotor 11 and the stator 12 are opposite to each other. More specifically, the magnetic pole parts 111 of the rotor 11 and the teeth 122b of the stator core 122 of the stator 12 are opposite to each other with the air gap therebetween. The magnetic pole parts 111 are exposed to the stator 12.

The supply current adjustment device 131 changes the magnetic resistance of a magnetic circuit F2 for the winding 121, which passes through the stator core 122. In this manner, the supply current adjustment device 131 changes the inductance of the winding 121, to adjust the current to be supplied to the motor 18. In more detail, the supply current adjustment device 131 moves the position of the stator core 122 relative to the winding 121. This is how the supply current adjustment device 131 changes the magnetic resistance of the magnetic circuit for the winding 121, which passes through the stator core 122.

The windings 121 are secured to a casing (not shown) of the generator 10. The stator core 122 is supported on the casing such that the stator core 122 is freely movable in the axial direction X relative to the windings 121. The windings 121 are not secured to the teeth 122b. A gap is ensured between each winding 121 having a cylindrical shape and each tooth 122b. The gap is to such an extent that the tooth 122b is freely movable relative to the winding 121.

The supply current adjustment device 131 moves the stator core 122 so as to move the teeth 122b in a direction into and out of the cylindrically wound windings 121. In this embodiment, the supply current adjustment device 131 moves the stator core 122 in the axial direction X. The control device 15 operates the supply current adjustment device 131 in accordance with the torque request.

In FIGS. 3A and 3B, for the purpose of describing the movement of the stator core 122 in an easy-to-understand manner, the supply current adjustment device 131 is schematically illustrated in the form of a rack-and-pinion mechanism and a motor. Here, mechanisms other than the illustrated one are adoptable as the supply current adjustment device 131 that moves the stator core 122. For example, a mechanism including a cylindrical member that is arranged concentric with a stator core in threaded engagement with the stator core is adoptable. Such a mechanism is able to move the stator core in the axial direction X by, for example, rotating the cylindrical member relative to the stator core.

The supply current adjustment device 131 moves the position of the stator core 122 relative to the winding 121 while maintaining the position of the stator core 122 relative to the rotor 11. In FIGS. 3A and 3B, the broken lines Q express that the rotor 11 moves in conjunction with the stator core 122 in the axial direction X. A structure for maintaining the relative position between the rotor 11 and the stator core 122 is implemented by, for example, a bearing part 113 rotatably supporting the rotor 11. The position of the bearing part 113 is fixed relative to the stator core 122.

FIG. 3A and FIG. 3B illustrate primary magnetic fluxes F1 generated by the magnetic pole parts 111. The line of each magnetic flux F1 represents a primary magnetic circuit through which the magnetic flux F1 generated by the magnetic pole part 111 flows. The magnetic circuit through which the magnetic flux F1 flows will be referred to as a magnetic circuit F1

The primary magnetic flux F1 generated by the magnetic pole part 111 flows through the magnetic pole part 111, the air gap between the magnetic pole part 111 and the tooth 122b, the tooth 122b, the core main body 122a, and the back yoke part 112. In other words, the magnetic circuit F1 is made up of the magnetic pole part 111, the air gap between the magnetic pole part 111 and the tooth 122b, the tooth 122b, the core main body 122a, and the back yoke part 112.

Here, FIG. 3A and FIG. 3B show three teeth 122b among the plurality of teeth 122b arranged in the circumferential direction. For providing plain illustration of the magnetic circuits F1, FIG. 3A and FIG. 3B show a state in which the magnetic pole part 111 is opposite to the middle tooth 122b among the three teeth 122b.

As the rotor 11 rotates, the amount of magnetic flux generated by the magnetic pole part 111 and linked with the winding 121 changes. The change of the amount of magnetic flux linked with the winding 121 causes an induced voltage to occur in the winding 121. That is, power is generated.

The induced voltage caused in the winding 121 depends on the amount of magnetic flux linked with the winding 121. The higher the magnetic resistance of the magnetic circuit F1 is, the smaller the amount of magnetic flux linked with the winding 121 is. The magnetic resistance of the magnetic circuit F1 depends mainly on the magnetic resistance of the air gap between the tooth 122b and the magnetic pole part 111. The magnetic resistance of the air gap between the tooth 122b and the magnetic pole part 111 depends on an air gap length L1 of the air gap between the tooth 122b and the magnetic pole part 111.

Accordingly, the induced voltage caused in the winding 121 depends on the air gap length L1 of the air gap between the tooth 122b and the magnetic pole part 111.

FIG. 3A and FIG. 3B illustrate a primary magnetic flux F2 generated by a current flowing in the winding 121. At a time of power generation, a current caused by the induced voltage flows in the winding 121. The magnetic flux F2 is generated by the current flowing in the winding 121 at the time of power generation. The line of each magnetic flux F2 represents a primary magnetic circuit through which the magnetic flux F2 generated by the current in the winding 121 flows. The magnetic circuit through which the magnetic flux F2 flows will be referred to as a magnetic circuit F2. The magnetic circuit F2 is the magnetic circuit for the winding 121. The magnetic circuit F2 for the winding 121 is made up of a path passing through the inside of the winding 121 and providing the minimum magnetic resistance of the entire magnetic circuit F2.

The magnetic circuit F2 passes through the stator core 122. The magnetic circuit F2 passes through adjacent teeth 122b. In the drawing, three teeth 122b among the plurality of teeth 122b arranged in the circumferential direction are shown. The magnetic circuit F2 for the winding 121 wound on the middle tooth 122b among the three teeth 122b is illustrated as a typical example. A magnetic circuit F2 for a certain winding 121 passes through a tooth 122b having the certain winding 121 wound thereon and two teeth 122b adjacent to the certain tooth 122b.

The primary magnetic flux F2 generated by the current in the winding 121 flows through the teeth 122b, the core main body 122a, and the air gap between the two adjacent teeth 122b. In other words, the magnetic circuit F2 is made up of the teeth 122b, the core main body 122a, and the air gap between the two adjacent teeth 122b. The magnetic circuit F2 passing through the stator core 122 includes one air gap. A portion of the magnetic circuit F2 including the air gap is indicated by the bold line. The bold-line portion of the magnetic circuit F2 including the air gap will be simply referred to as an air gap F2a. The air gap F2a exists between the winding 121 and the rotor 11. The air gap F2a included in the magnetic circuit F2 exists between the winding 121 and the rotor 11 and between the adjacent teeth 122b. The air gap F2a is a non-magnetic gap. A portion of the magnetic circuit F2 corresponding to the air gap F2a is provided so as to connect respective portions of the two adjacent teeth 122b opposite to the rotor 11.

The magnetic circuit F2 for the winding 121 includes the air gap F2a between the two adjacent teeth 122b. The magnetic circuit F2 does substantially not include the back yoke part 112 of the rotor 11. Most of the magnetic flux F2 generated by the current in the winding 121 flows through the air gap between the two adjacent teeth 122b without going to the back yoke part 112 of the rotor 11, for the following reasons.

For the magnetic flux F2 generated by the current in the winding 121, the magnetic pole part 111 is considered simply as a magnetic flux path. In this embodiment, the magnetic pole part 111 is made of a permanent magnet whose magnetic permeability is as low as air. The magnetic pole part 111 can therefore be considered as equivalent to air for the magnetic circuit F2. Since the magnetic pole part 111 is equivalent to air, the substantial air gap length of the air gap between the stator 12 and the rotor 11 is equal to a distance L11 from the tooth 122b to the back yoke part 112. The distance L11 from the tooth 122b to the back yoke part 112 includes the thickness of the magnetic pole part 111 with respect to the axial direction X. Thus, the distance L11 is longer than a distance L1 from the tooth 122b to the magnetic pole part 111.

In this embodiment, moreover, the amount of the magnetic flux F2 generated by the current in the winding 121 is smaller than the amount of magnetic flux generated by the permanent magnet of the magnetic pole part 111. Most of the magnetic flux F2 generated by the current in the winding 121 is less likely to reach the back yoke part 112 across the air gap length L11. Little of the magnetic flux F2 generated by the current in the winding 121 flows through the back yoke part 112. A length of a gap hereinafter refers to a width of the gap.

Thus, Most of the magnetic flux F2 generated by the current in the winding 121 flows through the air gap F2a between the teeth 122b rather than through the back yoke part 112 of the rotor 11. In the state shown in FIG. 3A, the inductance of the winding 121 is set to the highest settable value. In the state shown in FIG. 3A, the air gap F2a included in the magnetic circuit F2 has the highest magnetic resistance among portions of the magnetic circuit F2. The air gap F2a has a higher magnetic resistance than that of a remaining portion F2b of the magnetic circuit F2 other than the air gap F2a.

Accordingly, the ratio of a flux component flowing through the air gap between the teeth 122b to a flux component flowing through the back yoke part 112 of the rotor 11 is higher in the magnetic flux F2 than in the magnetic flux F1 which is generated by the magnetic pole part 111.

The inductance of the winding 121 depends on the magnetic resistance for the winding 121. The inductance of the winding 121 is in reverse proportion to the magnetic resistance for the winding 121.

Here, the magnetic resistance for the winding 121 is the magnetic resistance of the magnetic circuit F2 through which the magnetic flux F2 generated by the current in the winding 121 flows. The magnetic resistance of the stator core 122, which is the magnetic resistance for the winding 121, includes the magnetic resistance of the air gap F2a between the two adjacent teeth 122b. In a strict sense, the magnetic flux F2 generated by the current in the winding 121 flows through both the stator 12 and the rotor 11. As described above, however, most of the magnetic flux generated by the current in the winding 121 flows through the air gap between the two adjacent teeth 122b without going to the back yoke part 112 of the rotor 11. Therefore, the magnetic resistance to the winding 121 depends more strongly on the magnetic resistance of the magnetic circuit F2 passing through the stator 12 than on the magnetic resistance of the magnetic circuit F1 passing through the rotor 11. That is, the inductance of the winding 121 depends more strongly on the magnetic resistance of the magnetic circuit F2, which passes through the stator core 122 when viewed from the winding 121 side, than on the magnetic resistance of the magnetic circuit F1, which passes through the rotor 11 when viewed from the winding 121 side. Accordingly, the inductance of the winding 121 substantially depends on the magnetic resistance of the magnetic circuit F2, which passes through the stator core 122 when viewed from the winding 121 side.

The supply current adjustment device 131 moves the position of the stator core 122 relative to the windings 121. In this manner, the supply current adjustment device 131 changes the magnetic resistance of the magnetic circuit F2 for the winding 121, which passes through the stator core 122. This is how the supply current adjustment device 131 changes the inductance of the winding 121. For example, in case of the supply current adjustment device 131 moving the stator core 122 in a direction indicated by the arrow X1, the teeth 122b of the stator core 122 are moved in the direction out of the cylindrically wound windings 121.

FIG. 3B shows a state having a lower inductance than that of the state shown in FIG. 3A.

Since the teeth 122b of the stator core 122 are moved out of the windings 121, the volume of the stator core 122 existing within the windings 121 is reduced. As a result, the magnetic flux within the winding 121 spreads. From the viewpoint of the magnetic circuit F2 for the winding 121, the length of the air gap F2a constituting the magnetic circuit F2 increases. This increases the magnetic resistance of the air gap F2a between the winding 121 and the rotor 11. That is, the magnetic resistance of the air gap F2a, whose magnetic resistance is highest, increases. As a result, the magnetic resistance of the magnetic circuit F2 for the winding 121, which passes through the stator core 122, increases. Consequently, the inductance of the winding 121 decreases.

The supply current adjustment device 131 changes the magnetic resistance of the air gap F2a whose magnetic resistance is highest. In this manner, the supply current adjustment device 131 changes the magnetic resistance of the magnetic circuit F2 passing through the adjacent teeth 122b. This can cause a larger change of the inductance of the winding 121 as compared with, for example, changing the magnetic resistance of a portion other than the air gap F2a.

Furthermore, the supply current adjustment device 131 changes the inductance of the winding 121 such that the change rate of the inductance of the winding 121 is higher than the change rate of the magnetic flux linked with the winding 121. This is how the supply current adjustment device 131 adjusts the current. The supply current adjustment device 131 of the generator 10 according to this embodiment moves the position of the stator core 122 relative to the windings 121 while maintaining the position of the stator core 122 relative to the rotor 11.

As the supply current adjustment device 131 moves the stator core 122 in the direction of the arrow X1, the rotor 11 is accordingly moved in the direction of the arrow X1. Therefore, the position of the stator core 122 relative to the rotor 11 is maintained. This can suppress a change of the air gap length L1 between the teeth 122b and the magnetic pole parts 111, which otherwise might be caused by movement of the stator core 122. Accordingly, a change of the magnetic flux F1 flowing from the magnetic pole part 111 to the stator core 122 is suppressed. That is, a change of the magnetic flux F1 linked with the winding 121 is suppressed.

Figure 4:
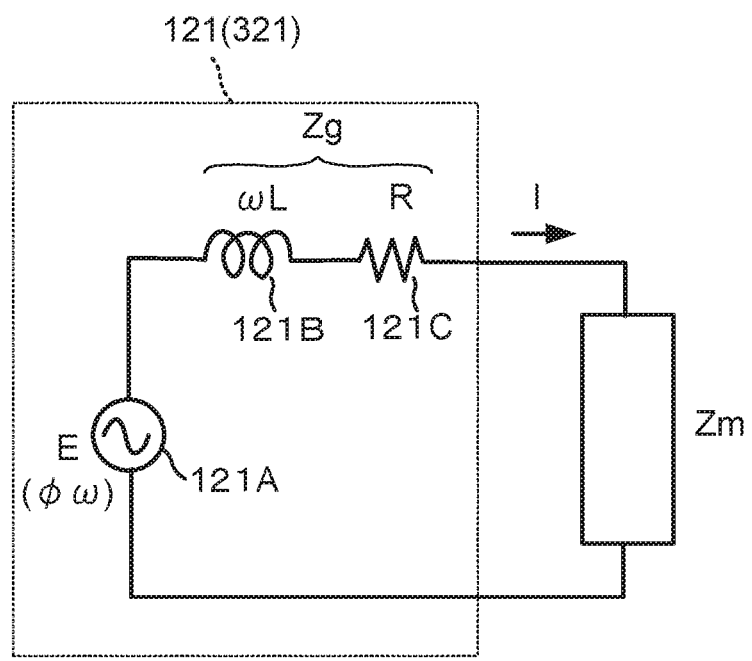
FIG. 4 is a circuit diagram schematically showing an equivalent circuit of a winding included in the generator shown in FIGS. 3A and 3B.

FIG. 4 is a circuit diagram schematically showing an equivalent circuit of the winding 121 of the generator 10 shown in FIG. 3A.

The circuit depicted in FIG. 4 is simplified for the purpose of outlining a change of the voltage and current generated by the generator 10. In addition, illustration of the converter 16 and the inverter 17 is omitted on the assumption that their states are fixed.

As shown in FIG. 4, the winding 121 in an electrical sense includes an AC voltage source 121A, an inductor 121B, and a resistance 121C.

The AC voltage source 121A outputs an induced voltage E which depends mainly on a magnetic flux $\Phi$ linked with the winding 121. More specifically, the induced voltage E depends on the product of the magnetic flux F1 and the rotation speed $\omega$ of the rotor 11. An inductance L of the inductor 121B depends mainly on the magnetic resistance of the stator core 122 for the winding 121. A resistance value R of the resistance 121C is a winding resistance. Impedance Zg of the winding 121 is schematically expressed as $((\omega L)^2 + R^2)^{1/2}$.

The supply current adjustment device 131 moves the position of the stator core 122 relative to the winding 121 in accordance with the current request. Thus, the supply current adjustment device 131 changes the magnetic resistance of the magnetic circuit F2 for the winding 121, which passes through the stator core 122. Thus, the supply current adjustment device 131 changes the inductance L of the winding 121. The change of the inductance L leads to a change of the impedance Zg. As a result, a current I to be supplied from the generator 10 is adjusted.

The supply current adjustment device 131 changes the inductance of the winding 121 such that the change rate of the magnetic flux $\Phi$ linked with the winding 121 is lower than the change rate of the inductance L of the winding 121. This is how the supply current adjustment device 131 adjusts the current I. Accordingly, the current is adjusted with less change of the induced voltage E.

Instead of making adjustment by the supply current adjustment device 131, changing the output (rotational power) of the engine 14 is also conceivable as a method for adjusting the current outputted from the generator 10. The engine output adjustment device 141 changes the rotation speed of the engine 14, to change the rotation speed $\omega$ of the rotor 11, so that the voltage to be supplied to the motor 18 is adjusted.

The output (rotational power) of the engine 14 mainly changes the rotation speed of the output shaft C, that is, the rotation speed $\omega$ of the rotor 11. The rotation speed $\omega$ of the rotor 11 influences both the induced voltage E of the winding 121 and the impedance $((\omega L)^2 + R^2)^{1/2}$. Therefore, adoption of only the method of changing the rotation speed of the output shaft C of the engine 14 cannot avoid high interaction between the supply voltage and the supply current.

In this respect, the generator 10 moves the position of the stator core 122 relative to the winding 121 in accordance with the torque request which corresponds to the current request, to change the magnetic resistance of the magnetic circuit F2 for the winding 121, which passes through the stator core 122. As a result, the inductance of the winding 121 is changed. Therefore, the ratio of a current change to a voltage change obtained when changing the magnetic resistance of the magnetic circuit F2 for the winding 121 is different from that obtained when changing the rotation speed $\omega$ of the rotor 11. Accordingly, the generator 10 of this embodiment is able to adjust the current to be supplied to the motor 18 with less interaction between the voltage change and the current change as compared with when, for example, only the rotation speed of the output shaft C of the engine 14 is changed by the engine output adjustment device 141.

In this embodiment, a movement of the position of the stator core 122 relative to the winding 121 causes a change of the magnetic resistance of the magnetic circuit F2 for the winding 121, which passes through the stator core 122. As a result, the inductance L of the winding 121 is changed, so that the current is adjusted. This embodiment can gradually change the inductance L because the change of the inductance L is implemented by a change of the magnetic resistance of the stator core 122 for the winding 121.

Instead of changing the magnetic resistance of the magnetic circuit for the winding which passes through the stator core, changing the substantial number of turns of the winding is also conceivable as a method for changing the inductance. For example, it is conceivable that a terminal provided at an end of the winding and a terminal provided in the middle of the winding are selectively switched for use as a current output terminal. It is also conceivable that a terminal provided in the middle of the winding is short-circuited to another terminal. This changes the substantial number of turns which affect the current. As a result, the inductance is changed.

Here, in a case of changing the substantial number of turns of the winding, such a change of the substantial number of turns is caused significantly and instantaneously. Therefore, an excessive voltage occurs in the winding. In addition, an excessive current is likely to flow in a short time. In a case of changing the substantial number of turns, it is required that a switching element for switching the current is provided. Furthermore, the switching element needs to have a high breakdown voltage in order to withstand the excessive voltage. The winding needs to be made of a thick wire in order to deal with a change of the excessive current. For these reasons, changing the substantial number of turns of the winding is less efficient. In addition, it involves a size increase of the generator.

In this embodiment, the magnetic resistance of the stator core 122 is changed, so that the inductance L of the winding 121 is changed. Thus, the inductance L of the winding 121 can be changed gradually. This can suppress a rapid increase of the voltage occurring in the winding 121. It is therefore possible that a component having a low breakdown voltage is connected to the generator 10. This provides a high efficiency. This also eliminates the need to provide the switching element for switching the current. This also allows use of a relatively thin wire for the winding. A size increase of the generator 10 is suppressed.

[Control of Torque and Speed]

Figure 5:
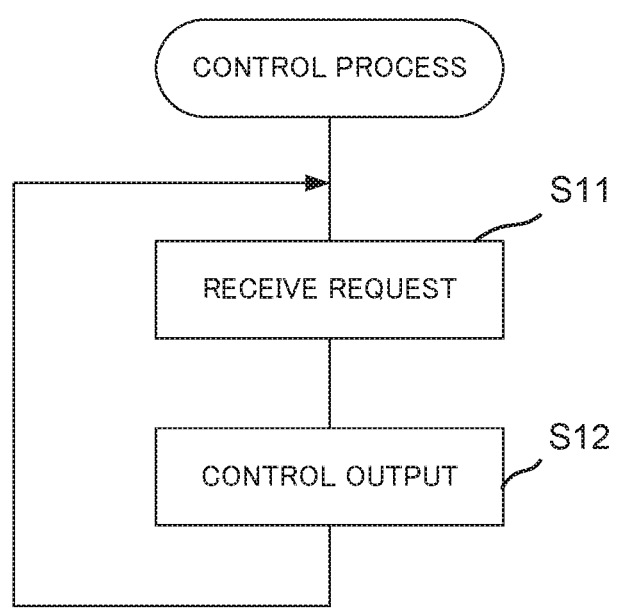
FIG. 5 is a flowchart of an operation of the transmission.

FIG. 5 is a flowchart of the operation of the transmission T.

Rotational power outputted from the transmission T to the drive wheels Wc, Wd is controlled in both the engine 14 and the transmission T. The rotational power is controlled by the control device 15 and the engine control device EC. In this embodiment, the control device 15 and the engine control device EC cooperate with each other. In the following, therefore, the operation of the engine 14 as well as the operation of the transmission T will be described.

The control device 15 of the transmission T controls the current and voltage to be supplied to the motor 18. The control device 15 repeats a control process shown in FIG. 5.

The torque request receiving device 151 of the control device 15 and the engine control device EC receive a request for rotational power (S11). The torque request receiving device 151 receives a torque request. The torque request represents a request for a torque to be outputted from the transmission T. The torque request receiving device 151 receives the amount of operation of the request indication device A. The torque request receiving device 151 obtains the torque request based on the amount of operation of the request indication device A. More specifically, the torque request receiving device 151 obtains the torque request based on the amount of operation of the request indication device A, the state of traveling of the vehicle V setting of the target fuel efficiency, and setting of the followability to the operation. The torque request receiving device 151 obtains both a request for the torque and a request for the rotation speed.

Then, the adjustment control device 152 of the control device 15 and the engine control device EC control the rotational power based on the request received (S12). The adjustment control device 152 and the engine control device EC control the supply current adjustment device 131 and the engine output adjustment device 141, respectively, in accordance with the request received (S12). The adjustment control device 152 controls the torque to be outputted from the transmission T based on the request received by the torque request receiving device 151. Upon a request for increasing the torque, the adjustment control device 152 controls the torque to be outputted from the transmission T. In more detail, upon a request for increasing the torque, the adjustment control device 152 performs the control so as to increase the torque to be outputted from the transmission T. The adjustment control device 152 controls the torque and the rotation speed to be outputted from the transmission T.

The adjustment control device 152 cooperates with the engine control device EC to control the torque and the rotation speed to be outputted from the transmission T. The adjustment control device 152 and the engine control device EC control the amount of adjustment made by the supply current adjustment device 131 and the amount of adjustment made by the engine output adjustment device 141. The adjustment control device 152 and the engine control device EC control a distribution between the amount of adjustment made by the supply current adjustment device 131 and the amount of adjustment made by the engine output adjustment device 141.

The adjustment control device 152 controls a distribution between the amount of increase of the torque to be outputted from the transmission T and the amount of increase of the rotation speed to be outputted from the transmission T. As for the control performed by the adjustment control device 152 and the engine control device EC, a typical example of a control with a large amount of increase of the torque and a typical example of a control with a large amount of increase of the rotation speed will be described. The typical example of the control with a large amount of increase of the torque will be referred to as a torque control. The typical example of the control with a large amount of increase of the rotation speed will be referred to as a speed control. The adjustment control device 152 and the engine control device EC perform any of the torque control, the speed control, and a combination of the torque control and the speed control, in accordance with the request received.

(Speed Control)

In the speed control, the engine control device EC increases the rotational power of the engine 14. To be specific, the engine control device EC directs the engine output adjustment device 141 to increase the amount of air taken in and the amount of fuel injected by the engine 14. The increase of the power of the engine 14 leads to an increase of the rotation speed of the engine 14 which means the rotation speed ω of the rotor 11 of the generator 10.

In the speed control, the control device 15 does not direct the supply current adjustment device 131 to perform the adjustment for reducing the inductance L of the winding 121. The supply current adjustment device 131 maintains the state in which the teeth 122b of the stator core 122 are completely received in the cylindrical shapes of the windings 121, as shown in FIGS. 3A and 3B.

As the rotation speed ω increases, the induced voltage E of the AC voltage source 121A shown in FIG. 4 increases. The induced voltage E is substantially in proportion to the rotation speed ω. This results in an increase of the voltage outputted from the transmission T. That is, the voltage supplied to the motor 18 increases. As a result, the rotation speed of the motor 18 increases.

(Torque Control)

In the torque control, the control device 15 directs the supply current adjustment device 131 to adjust the position of the stator core 122 so as to reduce the inductance L of the winding 121. The supply current adjustment device 131 adjusts the position of the stator core 122 so as to increase the magnetic resistance of the stator core 122 for the winding 121. In this embodiment, the supply current adjustment device 131 moves the stator core 122 in such a direction that the teeth 122b of the stator core 122 are moved out of the cylindrical shapes of the windings 121 shown in FIGS. 3A and 3B. As a result, the inductance L of the winding 121 is reduced.

In the transmission T, the control device 15 directs the supply current adjustment device 131 to adjust the magnetic resistance of the magnetic circuit F2 for the winding 121 in accordance with the torque request. The control device 15 directs the supply current adjustment device 131 to adjust the magnetic resistance of the magnetic circuit F2 for the winding 121 in accordance with the current request corresponding to the torque request. In this manner, the supply current adjustment device 131 changes the inductance of the winding 121. This is how to control the current to be supplied to the motor 18 serving as the electrical load device.

In the transmission T, for example, the control device 15 directs the supply current adjustment device 131 to increase the magnetic resistance of the magnetic circuit F2 for the winding 121, in accordance with a request for increasing the torque. In the transmission T, the control device 15 directs the supply current adjustment device 131 to increase the magnetic resistance of the magnetic circuit F2 for the winding 121, in accordance with a request for increasing the current, which corresponds to a request for increasing the torque. Thus, the supply current adjustment device 131 reduces the inductance of the winding 121. This can increase the current to be supplied to the motor 18 serving as the electrical load device.

The supply current adjustment device 131 changes the inductance of the winding 121 by changing the magnetic resistance of the air gap F2a existing between the winding 121 and the rotor 11. The magnetic pole parts 111 moving along with rotation of the rotor 11 cause an alternating magnetic field to occur between the windings 121 and the rotor 11. For example, reducing the magnetic resistance of the air gap F2a existing between the winding 121 and the rotor 11 leads to a reduction of an alternating magnetic field loss. To be exact, a core loss in the magnetic circuit F2 passing through the air gap F2a is reduced. The reduction of the loss enables a large current to be outputted. Accordingly, the current to be supplied to the motor 18 serving as the electrical load device can be adjusted to an increased degree.

In the torque control, moreover, the engine control device EC directs the engine output adjustment device 141 (FIG. 2) to increase the rotational power of the engine 14. To be specific, the engine control device EC directs the engine output adjustment device 141 to increase the amount of air taken in and the amount of fuel injected by the engine 14. The increase of the rotational power of the engine 14 leads to an increase of the rotation speed of the engine 14 which means the rotation speed ω of the rotor 11 of the generator 10.

As the rotation speed ω increases, the induced voltage E of the AC voltage source 121A increases. The induced voltage E is substantially in proportion to the rotation speed ω. The increase of the induced voltage E results in an increase of the current outputted from the generator 10. That is, the current supplied to the motor 18 increases. As a result, the torque of the motor 18 increases.

Figure 9:
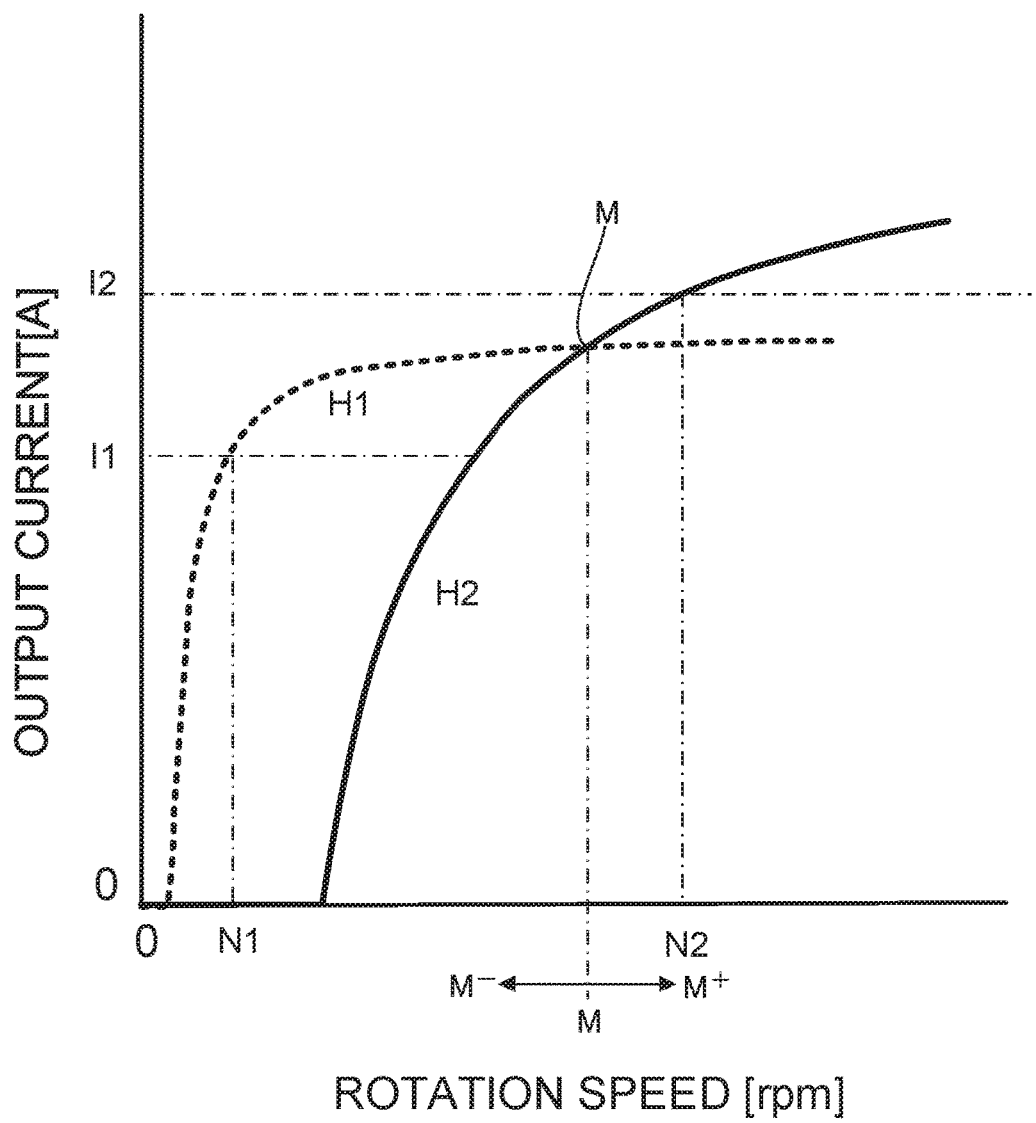
FIG. 9 is a graph showing output current characteristics relative to the rotation speed of a rotor included in the generator shown in FIG. 7.

The control device 15 and the engine control device EC perform the control by using, for example, a map in which the inductance, the rotation speed of the rotor 11, and the output current are stored in association with one another. The map is obtained based on the following relationships (i) and (ii), for example. The relationship (i) is the relationship between the rotation speed of the engine 14 and the input current of the motor 18. The relationship (ii) is the relationship between the torque and the rotation speed of the motor 18. The relationship (i) is specified or set based on, for example, measurement or simulation of the generator which have been preliminarily conducted for a plurality of conditions of the inductance L. The relationship (i) includes the relationship between the rotation speed and the output current of the generator 10 as shown in FIG. 9, for example. The relationship (i) also includes an influence of the operations of the converter 16 and the inverter 17. The relationship (ii) is specified or set based on, for example, a result of measurement or simulation of the motor which have been preliminarily conducted.

For example, the control device 15 determines, as a target, the input current of the motor 18 corresponding to the requested torque of the transmission T. For example, the control device 15 controls the supply current adjustment device 131 so as to obtain the inductance L that allows the target current to be supplied at the minimum rotation speed of the generator 10.

The engine control device EC operates the engine 14 at such a rotation speed that allows the target current to be supplied under the condition of the inductance L obtained by the control device 15. In a case where the current and the voltage are limited by the converter 16 and the inverter 17, the rotation speed is adjusted based on an influence of the limiting.

Here, it may be acceptable that the control device 15 and the engine control device EC control the supply current adjustment device 131 without using the map. For example, the control performed by the control device 15 and the engine control device EC may be based on a result of computation of expressions.

The control device 15 and the engine control device EC are configured to cooperate with each other to control the supply current adjustment device 131 and the engine output adjustment device 141, respectively. For example, the control device 15 transmits information of the required rotation speed to the engine control device EC.

Preferably, an entire period in which the supply current adjustment device 131 reduces the inductance of the winding 121 has an overlap with an entire period in which the engine output adjustment device 141 increases the rotational power of the engine 14. Preferably, a period in which the supply current adjustment device 131 is reducing the inductance of the winding 121 has an overlap with a period in which the engine output adjustment device 141 is increasing the rotational power of the engine 14.

In this embodiment, upon a requirement for increasing the torque, the engine 14 increases the rotational power of its output shaft C by means of the adjustment made by the engine output adjustment device 141. As a result, the rotation speed ω of the rotor 11 of the generator 10 increases. On the other hand, the transmission T reduces the inductance L of the winding 121 by means of the adjustment made by the supply current adjustment device 131. As a result, an increase of the impedance Zg of the winding 121, which depends on the product of the rotation speed ω and the inductance L, is suppressed. This provides a greater increase of the current outputted from the generator 10 as compared with when, for example, the inductance L of the winding 121 is not reduced. Accordingly, a greater increase of the torque outputted from the transmission T is obtained as compared with when, for example, the inductance L of the winding 121 is not reduced.

Thus, even though the condition about the rotational power of the engine 14 is constant, the torque outputted from the transmission T changes in accordance with the adjustment performed in the transmission T. In the transmission T, moreover, the torque adjustment range of the torque outputted from the transmission T is enlarged by performing the torque control.

To respond to a request for an increase of the torque, for example, it is conceivable to increase the rotational power of the engine 14 without reducing the inductance L of the winding 121.

In such a case, as the rotational power increases, the rotation speed ω of the rotor increases. The induced voltage increases accordingly. The increase of the rotation speed ω also increases the impedance Zg of the winding. Therefore, the increase of the current supplied to the motor is smaller than the increase of the rotational power. As a result, the amount of increase of the torque is small.

Increasing the rotational power of the engine 14 without reducing the inductance L of the winding 121 for the purpose of increasing the current results in an excessive increase of the rotational power of the engine 14 relative to an increase of the power generation current. The excessive increase of the rotational power decreases the fuel efficiency of the engine 14.

In addition, the excessive increase of the rotational power causes an excessive increase of the induced voltage E. For example, in a situation where the rotation speed of the motor 18 becomes substantially constant after increasing, the current supplied to the motor 18 decreases. This makes the impedance Zg of the winding 121 less influential. Accordingly, a voltage corresponding to the induced voltage E, which has excessively increased, is outputted from the generator 10. Moreover, the converter 16 is arranged between the generator 10 and the motor 18. A high voltage corresponding to the induced voltage E is applied to the switching elements of the converter 16. In general, a switching element having a high breakdown voltage for withstanding a high voltage has a high on-resistance. Thus, a large loss is caused by the switching element.

In this respect, the generator 10 of this embodiment is configured such that the supply current adjustment device 131 reduces the inductance L of the winding 121 in response to a request for an increase of the torque. As a result, an increase of the impedance Zg of the winding 121 is suppressed. This allows a greater increase of the output torque of the transmission T to be obtained from the increase of the rotational power of the engine 14 as compared with when, for example, the inductance L is not reduced. In this manner, an excessive increase of the rotational power of the engine 14 in response to a request for increasing the torque is suppressed. This improves the fuel efficiency of the engine. Also, an excessive increase of the output voltage is suppressed. This allows adoption of a switching element with a low breakdown voltage, whose on-resistance is low. Accordingly, a high efficiency is obtained.

The transmission T of this embodiment is able to enhance separation between the adjustment of the output torque and the adjustment of the rotation speed as compared with when, for example, the output of the engine 14 is supplied to the drive wheels Wc, Wd without interposition of the transmission T. The transmission T is, therefore, able to make adjustment more responsive to each of the torque requirement and the speed requirement.

Furthermore, the transmission T of this embodiment controls the converter 16 and the inverter 17 by means of the control device 15. Thus, the transmission T is able to control the current and voltage to be supplied to the motor 18 independently of the adjustment made on the generator 10. The transmission T is, therefore, able to control the torque and the rotation speed to be outputted from the motor 18 of the transmission T independently of the adjustment made on the generator 10. This provides an increased degree of freedom in terms of controlling the output of the transmission T.

For example, the transmission T directs the converter 16 and the inverter 17 to stop the supply of electric power to the motor 18. In this manner, the transmission T is able to bring the motor 18 into the stopped state even while the engine 14 and the generator 10 are operating.

Second Embodiment

Next, a second embodiment of the present invention will be described. In the description of the second embodiment given below, differences from the first embodiment illustrated above will be mainly described.

Figure 6A:
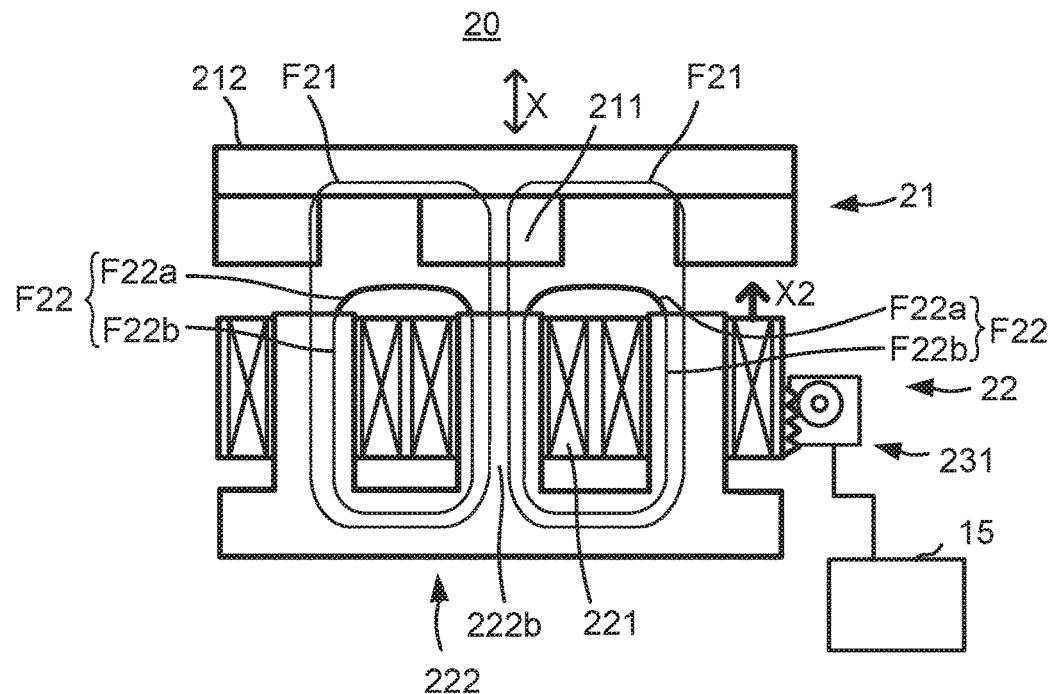
FIG. 6A is a schematic diagram for explanation of adjustment made by a supply current adjustment device included in a generator of a transmission according to a second embodiment.
Figure 6B:
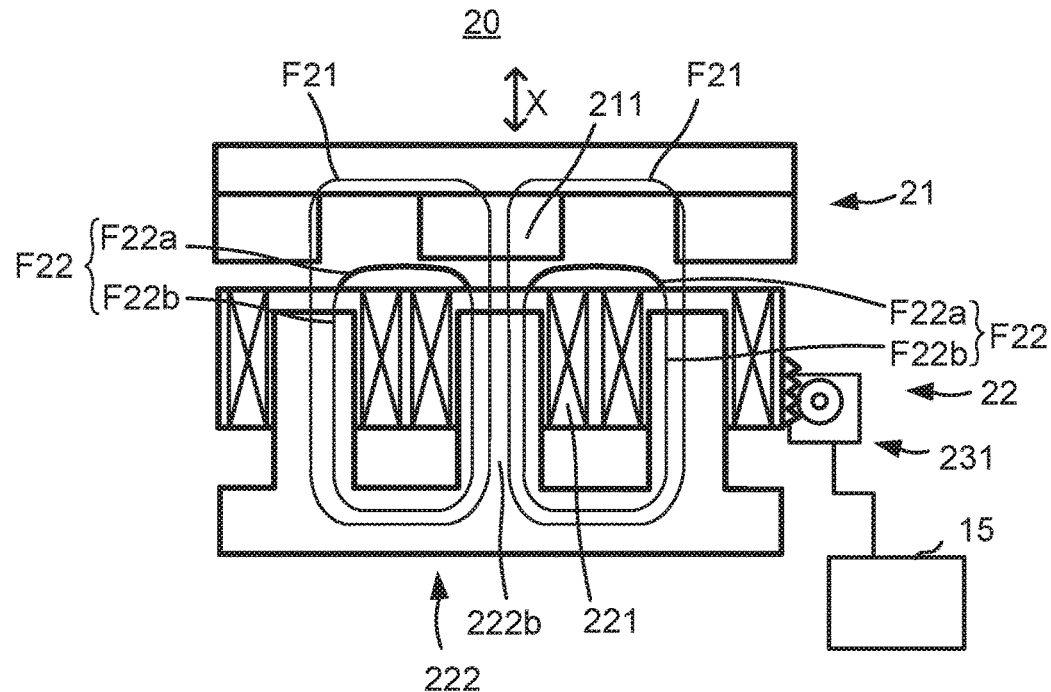
FIG. 6B is a schematic diagram showing a state in which the inductance of a winding is set lower than that of FIG. 6A.

FIG. 6A and FIG. 6B are schematic diagrams for explanation of adjustment made by a supply current adjustment device provided in a generator 20 of a transmission according to the second embodiment. FIG. 6A shows a state in which the inductance of the winding 221 is set to the highest settable value. FIG. 6B shows a state in which the inductance of the winding 221 is set to a value lower than that of FIG. 6A.

The positional relationship among windings 221, a stator core 222, and a rotor 21 shown in FIG. 6A is the same as the positional relationship thereamong in the first embodiment having been described with reference to FIG. 3A.

A magnetic circuit F21 is a magnetic circuit through which a magnetic flux generated by a magnetic pole part 211 flows. A magnetic circuit F22 is a magnetic circuit for the winding 221. The magnetic circuit F22 for the winding 221 is made up of a path passing through the inside of the winding 221 and providing the minimum magnetic resistance of the entire magnetic circuit F22. The magnetic circuit F22 passes through the stator core 222. The magnetic circuit F22 passes through two adjacent teeth 222b.

The magnetic circuit F22 passing through the stator core 222 includes an air gap F22a. The air gap F22a exists between the winding 221 and the rotor 21. The air gap F22a included in the magnetic circuit F22 exists between the winding 221 and the rotor 21 and between the two adjacent teeth 222b. The air gap F22a included in the magnetic circuit F22 is provided so as to connect respective portions of the two adjacent teeth 222b opposite to the rotor 21.

The magnetic circuit F22 for the winding 221 does not pass through a back yoke part 212 of the rotor 21. The magnetic circuit F22 for the winding 221 includes the air gap F22a between the two adjacent teeth 122b.

In the state shown in FIG. 6A, the air gap F22a included in the magnetic circuit F22 has the highest magnetic resistance among portions of the magnetic circuit F22. The air gap F22a has a higher magnetic resistance than that of a remaining portion F22b of the magnetic circuit F22 other than the air gap F22a.

In the generator 20 shown in FIGS. 6A and 6B, a supply current adjustment device 231 moves the windings 221. Thus, the supply current adjustment device 231 changes the magnetic resistance of the magnetic circuit F22 for the winding 221, which passes through the stator core 222. Thus, the supply current adjustment device 231 changes the inductance of the winding 221, to adjust the current to be supplied to the motor 18 (see FIG. 1).

The supply current adjustment device 231 moves the windings 221 without moving the stator core 222 of the stator 22.

More specifically, the stator core 222 is secured to a casing (not shown). The rotor 21 is rotatably supported on the casing. The rotor 21 is secured with respect to the axial direction X. The windings 221 are supported on the casing such that the windings 221 are freely movable in the axial direction X relative to the casing.

The supply current adjustment device 231 moves the windings 221 in the direction that causes the teeth 222b to move into and out of the cylindrical shapes of the windings 221. In this embodiment, the current adjustment device 231 moves the windings 221 in the axial direction X. The supply current adjustment device 231 moves the windings 221 in a direction indicated by the arrow X2, for example. All the windings 221 wound on the teeth 222b provided in the generator 20 are moved integrally. The control device 15 operates the supply current adjustment device 231 in accordance with the torque request.

FIG. 6B shows a state having a lower inductance than that of the state shown in FIG. 6A. The state shown in FIG. 6B is a state after the windings 221 are moved in the direction of the arrow X2.

In this embodiment, the supply current adjustment device 231 moves the windings 221 alone, in accordance with the torque request. In this manner, the supply current adjustment device 231 moves the position of the stator core 222 relative to the windings 221. Thus, the supply current adjustment device 231 changes the magnetic resistance of the magnetic circuit F22 for the winding 221, which passes through the stator core 222.

For example, when the windings 221 are moved in the direction of the arrow X2, that is, toward the rotor 21, the teeth 222b of the stator core 222 are pulled out of the windings 221. Pulling the teeth 222b out of the windings 221 reduces the volume of the stator core 222 existing within the windings 221. As a result, the length of the air gap F22a included in the magnetic circuit F22 for the winding 221 increases. This increases the magnetic resistance of the air gap F22a between the winding 221 and the rotor 21. That is, the magnetic resistance of the air gap F22a, which has the highest magnetic resistance, is increased. As a result, the magnetic resistance of the magnetic circuit F22 for the winding 221 increases. Consequently, the inductance of the winding 221 decreases.

The supply current adjustment device 231 changes the magnetic resistance of the air gap F22a whose magnetic resistance is highest. Thus, the supply current adjustment device 231 changes the magnetic resistance of the magnetic circuit F22 passing through the adjacent teeth 222b. Accordingly, a larger change of the inductance of the winding 221 is likely to occur as compared with, for example, changing the magnetic resistance of the portion F22b other than the air gap F22a.

In this manner, the supply current adjustment device 231 changes the magnetic resistance of the magnetic circuit F22 for the winding 221, which passes through the stator core 222. Thus, the supply current adjustment device 231 changes the inductance of the winding 221.

For example, the supply current adjustment device 231 increases the magnetic resistance of the magnetic circuit F22 for the winding 221 in accordance with a request for increasing the torque. Thus, the supply current adjustment device 231 increases the magnetic resistance of the magnetic circuit F22 for the winding 221 in accordance with a request for increasing the current. Thus, the supply current adjustment device 231 reduces the inductance of the winding 221. As a result, the current to be supplied to the motor 18 (see FIG. 1) can be increased.

The supply current adjustment device 231 changes the inductance of the winding 221 by changing the magnetic resistance of the air gap F22a existing between the winding 221 and the rotor 21. This results in a reduction of an alternating magnetic field loss. Accordingly, the current to be supplied to the motor 18 can be adjusted to an increased degree.

Third Embodiment

Next, a third embodiment of the present invention will be described. In the description of the third embodiment given below, differences from the first embodiment illustrated above will be mainly described.

Figure 7:
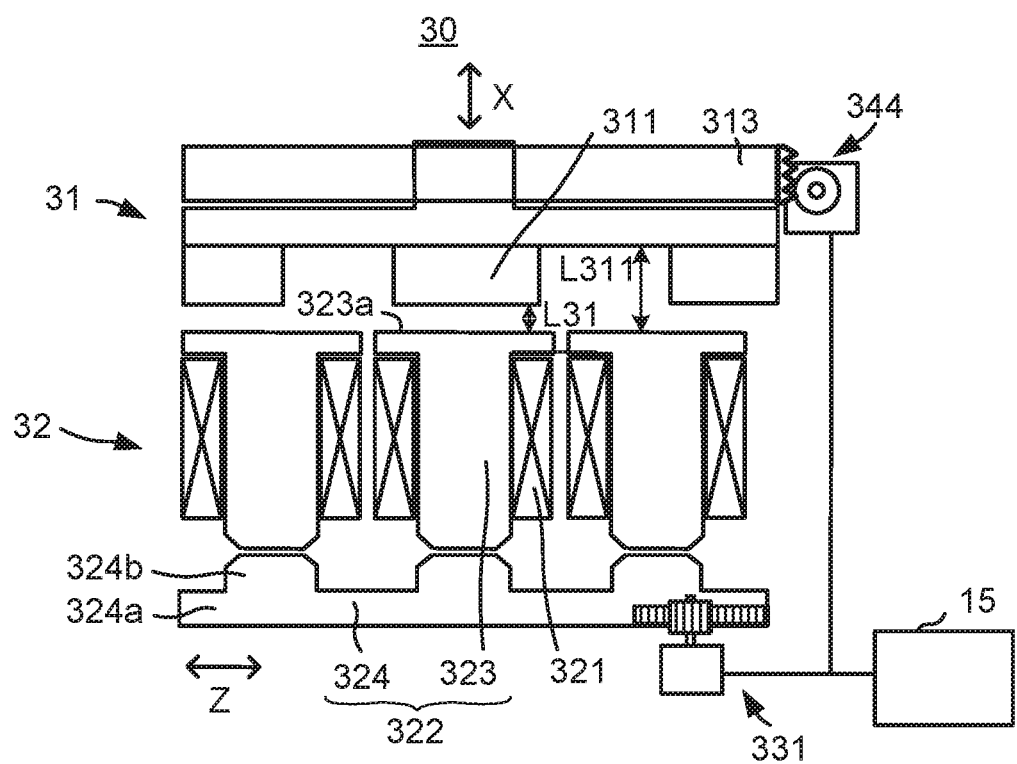
FIG. 7 is a schematic diagram showing a generator of a transmission according to a third embodiment.

FIG. 7 is a schematic diagram showing a generator 30 of a transmission according to the third embodiment.

A stator core 322 provided in the generator 30 shown in FIG. 7 includes a plurality of first stator core parts 323 and a second stator core part 324.

Each of the plurality of first stator core parts 323 is provided with a facing portion 323a that is opposite to the rotor 31 with an air gap therebetween. The plurality of first stator core parts 323 are annularly arranged at intervals. That is, the plurality of first stator core parts 323 align in the circumferential direction Z. The plurality of first stator core parts 323 function as primary teeth in the stator 32. In the specification herein, the first stator core parts 323 may also be referred to as first teeth 323. The length of the facing portion 323a of the first stator core part 323 with respect to the circumferential direction Z is longer than the length of any portion of the first stator core part 323 other than the facing portion 323a with respect to the circumferential direction Z. A winding 321 is wound on each of the first stator core parts 323.

The second stator core part 324 is arranged at a position opposite to the rotor 31 across the first stator core parts 323. The second stator core part 324 is not provided with the facing portion 323a that faces the rotor 31. The second stator core part 324 includes a stator yoke portion 324a having an annular shape and a plurality of second teeth 324b. The second teeth 324b protrude from the stator yoke portion 324a and toward the first stator core part 323. The number of the second teeth 324b is equal to the number of the first stator core parts 323. The stator yoke portion 324a and the second teeth 324b may be configured such that substantially all of the magnetic fluxes flowing through the second teeth 324b flow through the stator yoke portion 324a. That is, the second teeth 324b may be formed integral with the stator yoke portion 324a. Alternatively, the second teeth 324b may be formed separate from the stator yoke portion 324a such that they are attachable to the stator yoke portion 324a. The second teeth 324b are arranged so as to align in the circumferential direction Z. The plurality of second teeth 324b are annularly arranged at intervals equal to the intervals of the first stator core parts 323.

A supply current adjustment device 331 of the generator 30 of this embodiment moves the position of a part of the stator core 322 relative to the winding 321. The supply current adjustment device 331 moves one of the plurality of first stator core parts 323 and the second stator core part 324 relative to the other. In this manner, the supply current adjustment device 331 changes the magnetic resistance of a magnetic circuit F32 for the winding 321. This is how the supply current adjustment device 331 adjusts the current to be supplied to the motor 18.

In more detail, the first stator core parts 323 are secured to a casing (not shown). The second stator core part 324 is supported so as to be rotatable in the circumferential direction Z. The supply current adjustment device 331 rotates the second stator core part 324 in the circumferential direction Z about the rotation axis of the rotor 31. In this manner, the supply current adjustment device 331 moves the second stator core part 324 from a first state (see FIG. 8A) to a second state (see FIG. 8B).

Figure 8A:
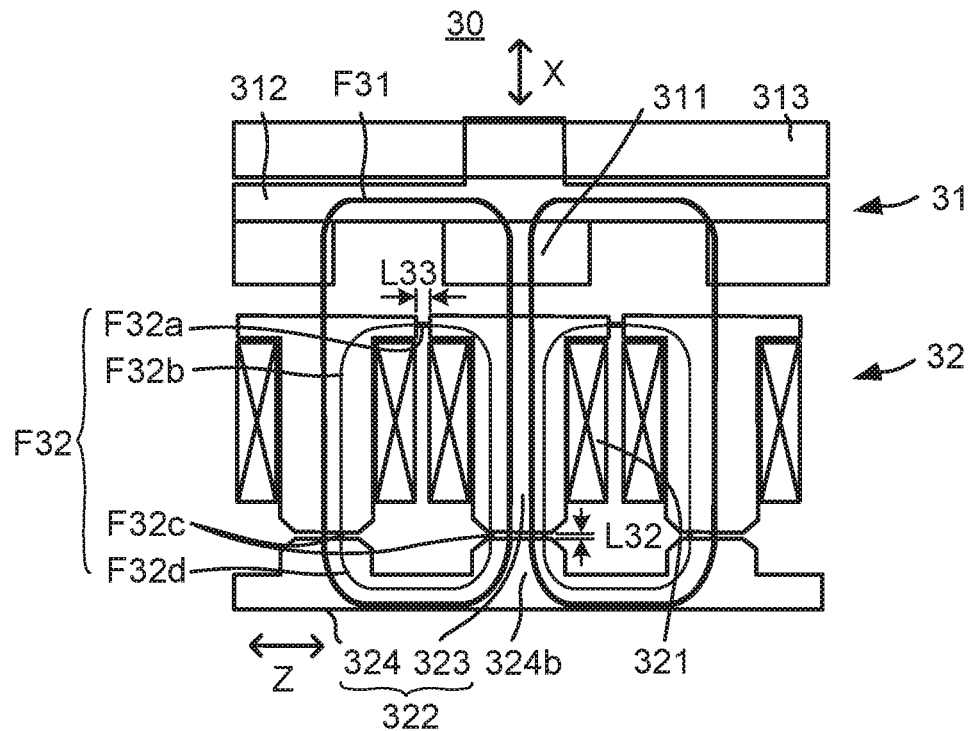
FIG. 8A is a schematic diagram showing a first state of a stator shown in FIG. 7.
Figure 8B:
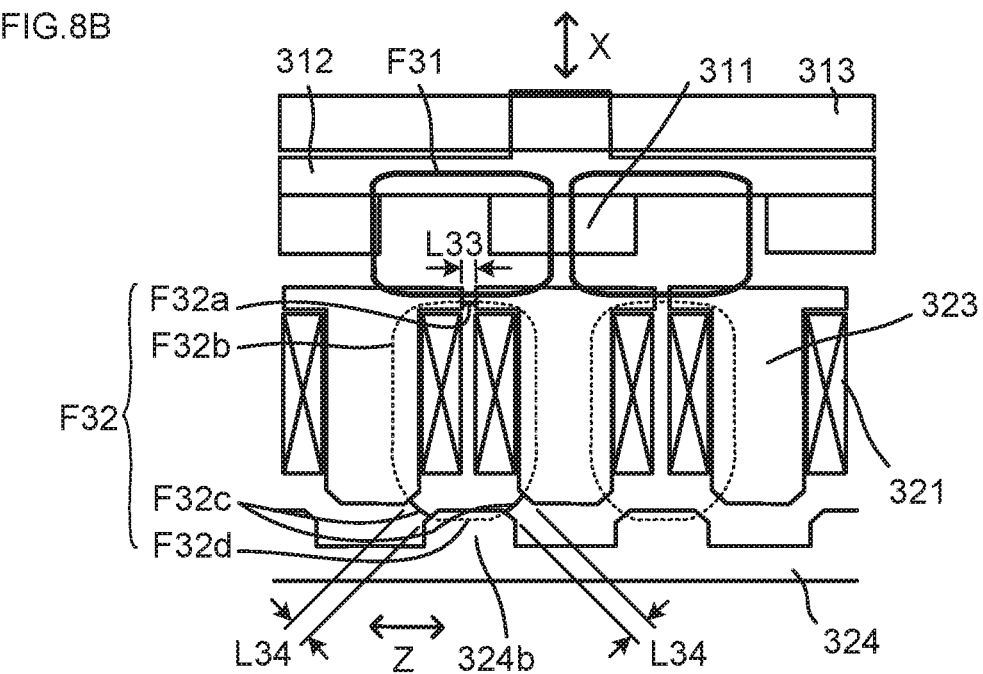
FIG. 8B is a schematic diagram showing a second state of the stator shown in FIG. 7.

FIG. 8A is a schematic diagram showing that the stator 32 illustrated in FIG. 7 is in the first state. FIG. 8B is a schematic diagram showing that the stator 32 illustrated in FIG. 7 is in the second state.

In the state shown in FIG. 8A, the inductance of the winding 321 is set to the highest settable value. In the state shown in FIG. 8B, the inductance of the winding 321 is set to a value lower than that of FIG. 8A.

In the first state shown in FIG. 8A, each of the plurality of second teeth 324b is positioned with respect to the circumferential direction Z so as to confront each of the plurality of first stator core parts 323. In the first state, an air gap length L32 between each of the plurality of first stator core parts 323 and the second stator core part 324 is shorter than an air gap length L33 between adjacent ones of the plurality of first stator core parts 323. To be exact, the air gap length L33 is the length of an air gap formed between respective portions of the first stator core parts 323, each of the portions arranged between the winding 321 and the rotor 31 with respect to a direction in which the rotor 31 and the stator 32 are opposite to each other.

In the second state shown in FIG. 8B, each of the plurality of second teeth 324b is positioned between adjacent ones of the first stator core parts 323 with respect to the circumferential direction Z. In the second state, an air gap length L34 between each of the plurality of first stator core parts 323 and the second stator core part 324 is longer than the air gap length L33 between adjacent ones of the plurality of first stator core parts 323.

Adjustment made by the supply current adjustment device 331 of the generator 30 according to the third embodiment will be described.

FIG. 8A and FIG. 8B illustrate a magnetic circuit F31 through which a magnetic flux generated by a magnetic pole part 311 flows, and a primary magnetic flux F32 generated by the current in the winding 321. The magnetic circuit F32 for the winding 321 is made up of a path passing through the inside of the winding 321 and providing the minimum magnetic resistance of the entire magnetic circuit F32. The magnetic circuit F32 passes through the stator core 322. The magnetic circuit F32 passes through adjacent first stator core parts 323 (first teeth 323).

The magnetic circuit F32 includes three air gaps. A portion of the magnetic circuit F32 corresponding to an air gap between the two adjacent first stator core parts 323 (first teeth 323) will be referred to as an air gap F32a. Portions of the magnetic circuit F32 corresponding to air gaps each between each of the two adjacent first stator core parts 323 (first teeth 323) and the second stator core part 324 will be referred to as air gaps F32c. The air gap F32a between the two adjacent first stator core parts 323 (first teeth 323) exists between the winding 321 and the rotor 31. The air gap F32a included in the magnetic circuit F32 exists between the winding 321 and the rotor 31 and between the two adjacent first stator core parts 323 (first teeth 323). The air gap F32a is provided so as to connect mutually opposite end surfaces of the respective two adjacent first stator core parts 323 (first teeth 323).

In the first state shown in FIG. 8A, the air gap length L32 between each of the plurality of first stator core parts 323 (first teeth 323) and the second stator core part 324 is shorter than the air gap length L33 between adjacent ones of the plurality of first stator core parts 323 (first teeth 323). The air gap length L33 is the largest air gap length in the magnetic circuit F32. In the first state, therefore, the air gap F32a between the adjacent first stator core parts 323 has the highest magnetic resistance among portions of the magnetic circuit F32 for the winding 321. The magnetic resistance of the air gap F32a is higher than the magnetic resistance of any of remaining portions F32b, F32c, and F32d of the magnetic circuit F32 other than the air gap F32a. The magnetic resistance of the air gap F32a is higher than the magnetic resistance of the air gap F32c between the first stator core part 323 and the second stator core part 324.

The magnetic flux F32 generated by the current in the winding 321 flows through the adjacent first stator core parts 323 and the second stator core part 324, as shown in FIG. 8A. The magnetic resistance of the magnetic circuit F32 for the winding 321, which passes through the stator core 322, depends on the air gap length L33 between the adjacent first stator core parts 323.

The magnetic flux F31 generated by the magnetic pole part 311 flows through the two adjacent first stator core parts 323. The magnetic flux F31 flows through one magnetic pole part 311, a gap between the magnetic pole part 311 and the first stator core part 323, the first stator core part 323, the second stator core part 324, an adjacent first stator core part 323, a gap between the first stator core part 323 and the magnetic pole part 311, an adjacent magnetic pole part 311, and the back yoke part 312. In the first state shown in FIG. 8A, the magnetic flux F31 of the magnetic pole part 311 flows through the two adjacent first stator core parts 323 and the second stator core part 324.

In the second state shown in FIG. 8B, the air gap length L34 between each of the plurality of first stator core parts 323 and the second stator core part 324 is longer than the air gap length L33 between adjacent ones of the plurality of first stator core parts 323. Therefore, the magnetic resistance of the magnetic circuit F32 for the winding 321, which passes through the stator core 322, is strongly influenced by the air gap length L34 between the first stator core part 323 and the second stator core part 324. As a result, in the second state, the magnetic resistance of the magnetic circuit F32 for the winding 321, which passes through the stator core 322, is higher than the magnetic resistance in the first state.

The magnetic flux F31 generated by the magnetic pole part 311 flows through one magnetic pole part 311, the gap between the magnetic pole part 311 and the first stator core part 323, and the first stator core part 323. The magnetic flux F31 flows from the first stator core part 323 directly to the adjacent first stator core part 323. The magnetic flux F31 generated by the magnetic pole part 311 flows through a gap between the two adjacent first stator core parts 323. In the second state, the path of the magnetic flux F31 generated by the magnetic pole part 311 is switched in the above-described manner. In the second state, even if the path of the magnetic flux F31 is not switched, at least a portion of the magnetic flux F31 generated by the magnetic pole part 311 is increased, the portion flowing through the gap between the two adjacent first stator core parts 323. The increase of the portion of the magnetic flux F31 flowing through the gap between the two adjacent first stator core parts 323 leads to a substantial increase of the magnetic resistance of the air gap F32a. This is, in a magnetic sense, equivalent to an increase of the air gap length L33 between the two adjacent first stator core parts 323. Thus, the magnetic resistance of the magnetic circuit F32 including the air gap F32a is further increased. The change rate of the inductance of the winding 321 is higher than the change rate of the magnetic flux that is generated by the magnetic pole part 311 and linked with the winding 321.

As described above, the inductance of the winding 321 is liable to be in reverse proportion to the magnetic resistance for the winding 321. Therefore, the inductance of the winding 321 in the second state is lower than the inductance of the winding 321 in the first state.

The supply current adjustment device 331 moves one of the plurality of first stator core parts 323 and the second stator core part 324 relative to the other so as to shift from the first state (see FIG. 8A) to the second state (see FIG. 8B). In this manner, the supply current adjustment device 331 changes the magnetic resistance of the magnetic circuit F32 for the winding 321. Thus, the supply current adjustment device 331 changes the inductance of the winding 321. This is how the supply current adjustment device 331 adjusts the current to be supplied to the motor 18 (see FIG. 1).

The supply current adjustment device 331 changes the magnetic resistance of the air gap F32a. The supply current adjustment device 331 changes the magnetic resistance of the air gap F32a without changing the air gap length L33 between the first stator core parts 323 serving as the adjacent teeth. Thus, the supply current adjustment device 331 changes the magnetic resistance of the magnetic circuit F32 passing through the first stator core parts 323 serving as the adjacent teeth. In the first state, the air gap F32a has the highest magnetic resistance among portions of the magnetic circuit F32. Therefore, a change of the inductance of the winding 321 can be greater than that obtained when, for example, changing the magnetic resistance of portions other than the air gap F32a.

The supply current adjustment device 331 changes the inductance of the winding 321 by changing the magnetic resistance of the air gap F32a existing between the winding 321 and the rotor 31. This results in a reduction of an alternating magnetic field loss. Accordingly, the current to be supplied to the motor 18 serving as the electrical load device can be adjusted to an increased degree.

FIG. 9 is a graph showing output current characteristics relative to the rotation speed of the rotor 31 of the generator 30 shown in FIG. 7.

In the graph of FIG. 9, the broken line H1 represents the output current characteristics in the first state shown in FIG. 8A. In a case of the generator 30 having the output current characteristics represented by the broken line H1, the generator 30 operates in such a manner that the combination of the output current and the rotation speed locates in a region on or below the broken line H1 in the graph of FIG. 9. The solid line H2 represents the output current characteristics in the second state shown in FIG. 8B. In a case of the generator 30 having the output current characteristics represented by the solid line H2, the generator 30 operates in such a manner that the combination of the output current and the rotation speed locates in a region on or below the solid line H2. Here, the graph of FIG. 9 shows the characteristics obtained when a supply voltage adjustment device 344 (see FIG. 7) is not operated, for describing a current control in an easy-to-understand manner.

The adjustment made in the generator 30 will be described with reference to the graph of FIG. 9.

Focusing on the output current obtained in the first state represented by the broken line H1, the output current increases as the rotation speed increases. The rotation speed of the rotor 31 is, therefore, also usable to adjust the output current of the generator 30. The rotation speed of the rotor 31 corresponds to the rotation speed of the output shaft C (see FIG. 2) of the engine 14.

In the first state, the increase of the output current in accordance with the increase of the rotation speed is steep in a region where the rotation speed of the rotor 31 is relatively low. In the first state, the increase of the output current in accordance with the increase of the rotation speed is gentle in a region where the rotation speed is relatively high. That is, the change rate of the output current relative to the change of the rotation speed is low in the region where the rotation speed is relatively high.

For example, if the generator 30 is fixed in the first state, a significant increase of the rotation speed of the rotor 31 is required in order to increase the output current in a region where the change rate of the output current relative to the change of the rotation speed is low.

For example, the vehicle V (see FIG. 1) traveling at a high speed requires a further increase of the output torque of the transmission T when the vehicle starts uphill traveling or overtakes another vehicle during traveling. A request for an increased torque is issued in such a situation.

If the request for an increased torque for achieving further acceleration is issued while the state of the supply current adjustment device 331 is fixed, a further increase of the rotation speed of the rotor 31, which means the rotation speed of the engine 14, is required. That is, an excessive increase of the rotational power of the engine 14 is required in order to increase the output torque.

For example, a situation is assumed in which, when the rotation speed is N1 and the output current is I1, a request for an increased torque is issued so that the current needs to be increased to I2. In this situation, if the generator 30 is fixed in the first state which corresponds to H1 in the graph, an excessive increase of the rotation speed of the rotor 31 occurs. In other words, an excessive increase of the rotation speed of the engine 14 occurs. This decreases the fuel efficiency of the engine 14 itself.

The induced voltage of the winding 321 is substantially in proportion to the rotation speed of the rotor 31. A significant increase of the rotation speed causes a significant increase of the induced voltage. To withstand the significant increase of the voltage, electrical components need to have a high breakdown voltage. This leads to a decrease in efficiency due to an increased breakdown voltage of the electrical components.

In the torque control, the control device 15 controls the supply current adjustment device 331 in accordance with the torque request. The torque request corresponds to the current request. The control device 15 changes the magnetic resistance of the magnetic circuit F32 for the winding 321, which passes through the stator core 322, in accordance with the torque request. Thus, the control device 15 changes the inductance of the winding 321. This is how to adjust the current to be supplied to the motor 18. To be more specific, the supply current adjustment device 331 moves the second stator core part 324 from the first state (see FIG. 8A) to the second state (see FIG. 8B). As a result, the output current characteristics change from the one represented by the broken line H1 to the one represented by the solid line H2 in FIG. 9.

For example, the control device 15 directs the supply current adjustment device 331 (see FIG. 7) to move the second stator core part 324 to create the second state (see FIG. 8B). Thus, the control device 15 reduces the inductance. In addition, the engine control device EC increases the rotational frequency of the engine 14 to N2. As a result, the output current increases to I2. The torque outputted from the transmission T increases in accordance with the increase of the output current.

The control device 15 performs the control in the above-described manner. This enlarges the torque adjustment range as compared with when, for example, only the rotational frequency of the engine 14 is increased.

In the torque control, the engine control device EC and the control device 15 cooperate with each other. The control device 15 directs the supply current adjustment device 331 to adjust the inductance of the winding while the engine control device EC directs the engine output adjustment device 141 to adjust the rotational power of the engine. The control device 15 starts a process of directing the supply current adjustment device 331 to reduce the inductance of the winding 321 before a process of increasing the rotational power of the engine 14 is terminated. That is, the control device 15 performs the control such that there is an overlap between a period in which the supply current adjustment device 331 is reducing the inductance of the winding 321 and a period in which the engine output adjustment device 141 is increasing the rotational power of the engine 14.

This provides a smooth increase of the current supplied from the generator to the motor 18. Accordingly, the torque increases smoothly. In addition, occurrence of a situation can be suppressed in which the rotational power of the engine excessively increases before the output current of the generator 30 reaches a current value corresponding to the requested torque in the process of adjusting the rotational power of the engine 14.

Next, a rotation speed control will be described. Upon a request for increasing the rotation speed, the control device 15 does not reduce the inductance L. The engine control device EC directs the engine output adjustment device 141 (see FIG. 2) to increase the rotational power of the engine 14.

In this embodiment, the control device 15 directs the engine output adjustment device 141 to increase the rotational power of the engine 14, while maintaining the supply current adjustment device 331 (see FIG. 7) in the first state (see FIG. 8A) which corresponds to the broken line H1 in the graph of FIG. 9.

The induced voltage E (see FIG. 4) generated in the generator 30 is substantially in proportion to the rotation speed ω. In particular, a situation requesting an increase of the voltage generally occurs when impedance Zm of the motor 18 itself is high. In such a state, the impedance Zg of the winding 321 is less influential to the output voltage of the generator. Therefore, a voltage according to the induced voltage E is outputted from the generator.

The transmission T is able to respond to a request for increasing the speed, without directing the supply current adjustment device 331 to reduce the inductance L of the winding 321.

In order that, instead of the transmission T of this embodiment, a commonly-used generator that is unable to change the inductance can provide output current characteristics as represented by the solid line H2 of FIG. 9, it is necessary to increase the thickness of the winding or the amount of magnets. Increasing the thickness of the winding or the amount of magnets leads to a size increase of the transmission itself. As a result, the mountability to vehicle and the portability of the transmission T are deteriorated. If a commonly-used generator that is unable to change the inductance is configured so as to provide output current characteristics as represented by the solid line H2, such generator cannot provide output current characteristics as represented by the broken line H1.

As a method for adjusting the current to be supplied to the motor 18, for example, use of a DC-DC converter is conceivable. A DC-DC converter configured to input and output electric power capable of driving the vehicle V however, cannot avoid a size increase of its component such as a built-in transformer in response to an increase of required electric power.

In the transmission T of this embodiment, the control device 15 controls the supply current adjustment device 331 so as to change the magnetic resistance of the magnetic circuit F32 for the winding 321, which passes through the stator core 322, in accordance with the current request. Thus, the control device 15 changes the inductance of the winding 321. This enables the transmission T to adjust the current in accordance with the torque request without increasing the thickness of the winding or the amount of magnets.

Referring to FIG. 7 again, the supply voltage adjustment device 344 of the generator 30 will be described.

The generator 30 includes the supply voltage adjustment device 344 in addition to the supply current adjustment device 331. The supply voltage adjustment device 344 is under control of the control device 15.

The supply voltage adjustment device 344 changes a linkage flux that flows from the magnetic pole part 311 of the rotor 31 and linked with the winding 321. In this manner, the supply voltage adjustment device 344 changes the induced voltage of the winding 321. This is how the supply voltage adjustment device 344 adjusts the voltage to be supplied to the motor 18. To be specific, the supply voltage adjustment device 344 moves the rotor 31 in the axial direction X. Thus, the supply voltage adjustment device 344 changes an air gap length L31 between the rotor 31 and the stator 32. Such a movement of the rotor 31 in the axial direction X is implemented by, for example, the supply voltage adjustment device 344 configured to move a bearing part 313 in the axial direction X, the bearing part 313 supporting the rotor 31 in a rotatable manner. The change of the air gap length L31 between the rotor 31 and the stator 32 leads to a change of the magnetic resistance between the rotor 31 and the stator 32. As a result, the amount of the magnetic flux generated by the magnetic pole part 311 and linked with the winding 321 is changed. The voltage generated by the generator 30 is changed accordingly. Controlling the voltage generated by the generator 30 in the transmission T provides an increased degree of freedom in terms of controlling the rotational power outputted from the transmission T.

As thus far described, the transmission T of this embodiment is able to adjust the voltage to be supplied to the motor 18 in a way other than by the engine output adjustment device 141 adjusting the rotational power of the engine 14. This provides an increased degree of freedom in terms of controlling, with suppression of a decrease in fuel efficiency.

The supply voltage adjustment device 344 is capable of more reduction of a variation in the linkage flux linked with the winding 321, the variation caused by the operation of the supply current adjustment device 331, the more reduction achieved in the following manner.

The linkage flux that flows from the magnetic pole part 311 of the rotor 31 and linked with the winding 321 flows through the stator core 322. Specifically, the linkage flux that flows from the magnetic pole part 311 and linked with the winding 321 flows through the first stator core part 323 and the second stator core part 324.

In response to the supply current adjustment device 331 moving the second stator core part 324 so as to shift from the first state (see FIG. 8A) to the second state (see FIG. 8B), the air gap length L32, L34 between the first stator core part 323 and the second stator core part 324 is changed. As a result, the amount of the linkage flux that flows from the magnetic pole part 311 of the rotor 31 and linked with the winding 321 is changed.

The supply voltage adjustment device 344 changes the air gap length L31 between the rotor 31 and the stator 32 so as to compensate for a variation in the linkage flux linked with the winding 321, the variation caused by the operation of the supply current adjustment device 331. This can reduce the variation in the linkage flux linked with the winding 321, the variation caused by the operation of the supply current adjustment device 331.

The supply current adjustment device 331, in combination with the compensation made by the supply voltage adjustment device 344, is able to adjust the current while less influenced by voltage constraints.

In the third embodiment described above, the generator 30 includes both the supply current adjustment device 331 and the supply voltage adjustment device 344. The supply voltage adjustment device, however, is not indispensable in the transmission of the present invention.

In the third embodiment described above with reference to the current characteristics graph of FIG. 9, the current to be supplied to the motor 18 can be adjusted while controlling the inductance. Here, it is to be noted that in the first embodiment and the second embodiment as well, the current to be supplied to the motor 18 can be adjusted while controlling the inductance.

The first stator core part 323, which is illustrated as an example of the first stator core part in the third embodiment above, has, in its end portion opposite to the rotor, protruding portions protruding in the circumferential direction Z which means the direction in which the first stator core parts are arranged side by side. It is however not always necessary that the first stator core part of the present invention includes the protruding portions.

In the embodiments described above, the rotor and the stator having an axial gap structure are illustrated as an example. The transmission of the present invention is also applicable to a radial gap structure in which a rotor and a stator are opposite to each other with an air gap therebetween with respect to a radial direction. The axial direction X (FIGS. 3A and 3B) defined in the axial gap structure of these embodiments is one example of the direction in which the rotor and the stator of the present invention are opposite to each other. In the radial gap structure, the rotor and the stator are opposite to each other with respect to the radial direction.

In the embodiments described above, the generator including an SPM generator is illustrated as an example. Alternatively, the generator of the present invention may be an IPM (Interior Permanent Magnet) generator.

The air gap illustrated in the embodiments described above is one example of the non-magnetic gap. The non-magnetic gap is a gap made of a single type of a non-magnetic material or a plurality of types of non-magnetic materials. No particular limitation is put on the non-magnetic material. Examples of the non-magnetic material include air, aluminum, and resins. The non-magnetic gap includes at least an air gap.

In the embodiments described above, the configuration in which the rotor 11 is connected directly to the output shaft C of the engine 14 is illustrated as a specific example of the configuration in which the rotor 11 is connected to the engine 14. Here, the output shaft C of the engine 14 and the rotor 11 of the generator 10 may be connected with interposition of a transmission mechanism as typified by a belt, a gear, or a drive shaft.

In the embodiments described above, the control device 15 and the engine control device EC configured to receive the torque request and the speed request from the request indication device A are illustrated as an example of the control device. This, however, is not limiting the present invention. In a possible example, the control device may be configured to receive a torque request from a device that outputs the torque request and a speed request from another device that outputs the speed request.

The control device of the present invention does not always have to communicate with the engine control device. In a possible example, the control device and the engine control device may share a common control map, and receive the same torque request from a request indication device that is provided in common to them. Since they perform controls based on the same torque request, the control device performs the control in cooperation with the engine control device.

Moreover, the control device may be integrated with the engine control device. For example, the control device may be built on a substrate or electronic device that is shared with the engine control device.

In the description, the control device 15 and the engine control device EC configured to perform the torque control, the speed control, or the combination of the torque control and the speed control are illustrated. The control device and the engine control device, however, may perform the speed control and the torque control alone. Alternatively, the control device may perform the torque control alone.

In the embodiments described above, the accelerator operator is illustrated as an example of the request indication device A. Here, the torque request issued to the transmission of the present invention may not always need to be an output of the request indication device. The following is some examples of the request indication device and the torque request issued to the transmission:

a signal of requesting acceleration issued by an automatic speed control device (cruise control) of the vehicle; or an output of a switch and volume different from the accelerator operator, which is operated by the driver.

The embodiments described above illustrate the example in which the control device configured to receive a signal is provided. Here, the torque request issued to the transmission is not limited to an electrical signal. It may be also acceptable that the control device of the present invention is operated by, for example, a wire connected to an operation lever. In such a configuration, the supply current adjustment device may move the stator core by using a force transmitted from the wire.

In the embodiments described above, the three-phase brushless motor is illustrated as an example of the motor 18. The motor of the present invention may be a motor having the same structure as that of the generator described in the embodiments, including the structure of the supply current adjustment device. For example, like the generator 30, the motor 18 may be structured so as to include the plurality of first stator core parts and the second stator core part and configured to move one of the first stator core parts and the second stator core part relative to the other.

In the embodiments described above, the vehicle V having four wheels is illustrated as an example of the apparatus to which the transmission is applied. Applications of the transmission of the present invention, however, are not limited thereto, and it may be applicable to a vehicle with three or less wheels, a vehicle with five or more wheels, and a vehicle with no wheel.

The transmission of the present invention is applicable to, for example, a vehicle provided with wheels. The transmission of the present invention is applicable to, for example, motorcycles, motor tricycles, buses, trucks, golf carts, carts, ATVs (All-Terrain Vehicles), ROVs (Recreational Off-highway Vehicles), and track-type vehicles.

The transmission of the present invention is applicable to, for example, a vehicle in which a drive mechanism different from wheels is driven. The transmission of the present invention is applicable to, for example, industrial vehicles typified by forklifts, snow blowers, agricultural vehicles, military vehicles, snowmobiles, construction machines, small planing boats (water vehicles), marine crafts, outboard engines, inboard engines, airplanes, and helicopters.

The rotational drive mechanism includes a driving member. The rotational drive mechanism may be a device, for example, a propeller, an impeller, a caterpillar, or a track belt. The rotating mechanism may not necessarily be a mechanism that drives a vehicle. The rotating mechanism may be a mechanism that drives a part of functions provided in a vehicle.

The transmission of the present invention is applicable to, for example, engine blowers, snow blowers, lawn mowers, agricultural implements, gas engine heat pumps, and general-purpose machines.

In the embodiments described above, the control device 15 constituted of a microcontroller is illustrated as an example of the control device. This, however, is not limiting the present invention. The control device may be constituted of a wired logic, for example.

The generator of the present invention may not always need to be attached to the crank case of the engine. The transmission of the present invention may be arranged in a position distant from the engine. For example, the transmission may configure a vehicle drive transmission device mountable to and dismountable from a vehicle body of a vehicle. Such a vehicle drive transmission device is an apparatus constituted of a physically single body that is mounted to and dismounted from the vehicle body. The vehicle drive transmission device is configured such that all components (for example, a generator, a motor, and the like) included in the vehicle drive transmission device are, as a single body, mountable to and dismountable from the vehicle body.

The torque request is a request for increasing, decreasing, or maintaining the torque outputted from the transmission to the rotating mechanism. Thus, a request for causing the torque outputted from the transmission to the rotating mechanism to rise from zero falls into the torque request. A request for zeroing the torque outputted from the transmission to the rotating mechanism falls into the torque request. A request for maintaining the torque outputted from the transmission to the rotating mechanism at zero is substantially equivalent to a request for keeping the transmission from outputting a torque to the rotating mechanism. Therefore, the request for maintaining the torque outputted from the transmission to the rotating mechanism at zero does not fall into the torque request. In other words, while the torque outputted from the transmission to the rotating mechanism is maintained at zero, no torque request is inputted. In the present invention, when the torque request is inputted to the transmission, the control device directs the supply current adjustment device to change the magnetic resistance of the magnetic circuit for the winding, which passes through the stator core. When the torque is outputted from the transmission to the rotating mechanism, the control device directs the supply current adjustment device to change the magnetic resistance of the magnetic circuit for the winding, which passes through the stator core, in accordance with the torque request inputted to the transmission.

The change of the inductance of the winding is implemented by changing the magnetic resistance of the magnetic circuit for the winding, which passes through the stator core. The change of the magnetic resistance of the magnetic circuit for the winding, which passes through the stator core, may be implemented in a plurality of stages or in a single stage, or may be implemented continuously. In other words, the output current characteristics of the generator may be changed in a plurality of stages or in a single stage, or may be changed continuously.

The broken line H1 of FIG. 9 represents exemplary output current characteristics obtained when the magnetic resistance of the magnetic circuit for the winding, which passes through the stator core, is low. The solid line H2 of FIG. 9 represents exemplary output current characteristics obtained when the magnetic resistance of the magnetic circuit for the winding, which passes through the stator core, is high. That is, the output current characteristics of the generator shown in FIG. 9 are not to be interpreted as limiting the change of the magnetic resistance of the magnetic circuit for the winding, which passes through the stator core, to a two-stage change as illustrated in this embodiment. The output current characteristics of the generator may be changed in a plurality of stages or in a single stage, or may be changed continuously. The output current characteristics represented by the broken line H1 and the solid line H2 of FIG. 9 are contained in the output current characteristics that are changed in a plurality of stages, in a single stage, or continuously. In the present invention, the magnetic resistance of the magnetic circuit for the winding, which passes through the stator core, may be changed in two stages.

A situation where the supply current adjustment device changes the state of the generator from one of a high-resistance state and a low-resistance state to the other will be described. In the low-resistance state, the magnetic resistance of the magnetic circuit for the winding, which passes through the stator core, is lower than that in the high-resistance state. For example, in a case where the state of the generator is changed so as to increase the magnetic resistance of the magnetic circuit for the winding, which passes through the stator core; the state of the generator before the change is the low-resistance state and the state of the generator after the change is the high-resistance state. In a case where the state of the generator is changed so as to reduce the magnetic resistance of the magnetic circuit for the winding, which passes through the stator core; the state of the generator before the change is the high-resistance state and the state of the generator after the change is the low-resistance state. Thus, no particular limitation is put on the absolute value of the magnetic resistance of the magnetic circuit for the winding, which passes through the stator core, in each of the high-resistance state and the low-resistance state. The high-resistance state and the low-resistance state are defined in a relative sense. The inductance of the winding in the high-resistance state is lower than the inductance of the winding in the low-resistance state.

In an example described below, exemplary output current characteristics of the generator in the low-resistance state correspond to the broken line H1 of FIG. 9, and exemplary output current characteristics of the generator in the high-resistance state correspond to the solid line H2 of FIG. 9. At the rotation speed (M) corresponding to the intersection M between the broken line H1 and the solid line H2, the generator in the high-resistance state and the generator in the low-resistance state output an equal magnitude of current at the equal rotation speed (M). That is, output current characteristic curves (H1, H2) of the generator obtained before and after the change of the magnetic resistance of the magnetic circuit for the winding, which passes through the stator core, have the intersection therebetween, and there is the rotation speed (M) corresponding to this intersection. Here, an output current characteristic curve means a curve representing the output current of the generator relative to the rotation speed of the rotor.

As shown in FIG. 9, the generator of the present invention is configured such that, in a case where the supply current adjustment device changes the state of the generator from the low-resistance state to the high-resistance state, the generator in the high-resistance state (H2) is able to output a current (I2) when rotating at a rotation speed (M+) higher than the rotation speed (M), the current (I2) being larger than the maximum current that could be outputted by the generator in the low-resistance state (H1) rotating at the rotation speed (M+). In the generator of the present invention, the state of the generator is changed so as to increase the magnetic resistance of the magnetic circuit for the winding, which passes through the stator core, thus enabling the generator to output a large current that could not be outputted at a relatively high rotation speed before the change.

As shown in FIG. 9, the generator of the present invention is configured such that, in a case where the supply current adjustment device changes the state of the generator from the high-resistance state to the low-resistance state, the generator in the low-resistance state (H1) is able to output a current when rotating at a rotation speed (M−) lower than the rotation speed (M), the current being larger than the maximum current that could be outputted by the generator in the high-resistance state (H2) rotating at the rotation speed (M−). In the generator of the present invention, the state of the generator is changed so as to reduce the magnetic resistance of the magnetic circuit for the winding, which passes through the stator core, thus enabling the generator to output a large current that could not be outputted at a relatively low rotation speed before the change.

As thus far described, the generator of the present invention is configured such that the generator after the supply current adjustment device changes the magnetic resistance of the magnetic circuit for the winding, which passes through the stator core, is able to output a current at the rotation speed (M− or M+) higher or lower than the rotation speed (M), the current being larger than the maximum current that the generator could output at the rotation speed (M− or M+) before the change.

The transmission of the present invention is able to supply a rotational torque different from the rotational torque outputted from the engine and a rotation speed different from the rotation speed outputted from the engine to the rotating mechanism (for example, the rotational drive mechanism).

The control device 15 controls the supply current adjustment device 131 as well as the converter 16 and/or the inverter 17 serving as the motor power control device in accordance with the torque request. In this case, the control device may perform a control of changing the operation mode of the motor power control device in accordance with the torque request at the same time as or at a different time than when performing the control of changing the inductance via the supply current adjustment device in accordance with the torque request. Here, the control of changing the operation mode of the motor power control device is a control of changing an on/off pattern of the converter and/or the inverter from one predefined pattern to another predefined pattern. The pattern recited herein may be a pattern whose on/off cycle is constant, or may be a pattern whose on/off cycle varies over time. The control of changing the operation mode of the motor power control device is distinct from a control of the operation of the motor power control device. The control of the operation of the motor power control device is a control for causing the motor power control device to operate based on a predefined on/off pattern.

It should be understood that the terms and expressions used in the embodiments above are for descriptions and have no intention to be construed in a limited manner, do not eliminate any equivalents of features shown and mentioned herein, and allow various modifications falling within the claimed scope of the present invention. The present invention may be embodied in many different forms. The present disclosure is to be considered as providing examples of the principles of the invention. A number of illustrative embodiments are described herein with the understanding that such examples are not intended to limit the invention to preferred embodiments described herein and/or illustrated herein. The embodiments described herein are not limiting. The present invention includes any and all embodiments having equivalent elements, modifications, omissions, combinations, adaptations and/or alterations as would be appreciated by those in the art based on the present disclosure. The limitations in the claims are to be interpreted broadly based on the language employed in the claims and not limited to examples described in the present specification or during the prosecution of the application. The present invention should be interpreted broadly based on the language employed in the claims.

REFERENCE SIGNS LIST

T transmission
V vehicle
10, 20, 30 generator
11, 21, 31 rotor
12, 22, 32 stator
14 engine
15 control device
16 converter
17 inverter
18 motor
131, 231, 331 supply current adjustment device
141 engine output adjustment device
151 torque request receiving device
152 adjustment control device
323 first stator core part
324 second stator core part
344 supply voltage adjustment device

The invention claimed is:

1. A transmission configured to output a rotational torque in accordance with a torque requirement, comprising:
   a generator, including a rotor, including a permanent magnet, configured to receive first rotational power outputted from an engine,
   a stator including a stator core with a winding wound thereon, the first rotational power causing the rotor and the stator to generate a current for outputting by the generator, and
   a supply current adjustment device configured to adjust magnetic resistance of a magnetic circuit for the winding, wherein the magnetic circuit passes through the stator core, to thereby switch between a low-resistance state and a high-resistance state, and to thereby change an inductance of the winding to adjust the output current;
   a motor configured to be driven by the current outputted from the generator, to thereby output second rotational power; and
   a control device configured to control the supply current adjustment device to change the inductance of the winding, in accordance with the torque requirement, wherein
   for each rotation speed of first rotational power, the current generated by the stator is of a first amount and a second amount when the supply current adjustment device is in the low-resistance state and the high-resistance state, respectively, the first amount being larger than the second amount when said each rotation speed is lower than a threshold, and smaller than the second amount when said each rotation speed is higher than the threshold, the supply current adjustment device changes the magnetic resistance of the magnetic circuit for the winding by moving at least a portion of the stator core relative to the winding, to thereby adjust the current to be outputted from the generator, and the control device is configured to control the current adjustment device to, responsive to receipt of the torque requirement, switch from the low-resistance state to the high-resistance state when a rotation speed of the received first rotational power is higher than the threshold, and switch from the high-resistance state to the low-resistance state when the rotation speed of the received first rotational power is lower than the threshold.

2. The transmission according to claim 1, further comprising a motor power control device provided in an electric power supply path between the generator and the motor, wherein the control device controls both the motor power control device and the supply current adjustment device, to thereby adjust the current outputted from the generator.

3. The transmission according to claim 2, wherein the magnetic circuit for the winding includes at least one non-magnetic gap between the winding and the rotor, and the supply current adjustment device adjusts the current to be outputted from the generator by changing the inductance of the winding, the changing of the inductance being implemented by changing magnetic resistance of the at least one non-magnetic gap between the winding and the rotor.

4. The transmission according to claim 3, wherein the magnetic resistance of the at least one non-magnetic gap is highest when the inductance of the winding is set to a highest settable value.

5. The transmission according to claim 2, wherein the magnetic circuit for the winding includes at least one non-magnetic gap, and the supply current adjustment unit adjusts the current to be outputted from the generator by changing the inductance of the winding, the changing of the inductance being implemented by changing magnetic resistance of a non-magnetic gap among the at least one non-magnetic gap, the magnetic resistance of the non-magnetic gap among the at least one non-magnetic gap being highest when the inductance of the winding is set to a highest settable value.

6. The transmission according to claim 1, further comprising an engine output adjustment device and an engine control device configured to control the engine output adjustment device, wherein the control device is configured to direct the supply current adjustment device to change the inductance of the winding while the engine control device directs the engine output adjustment device to adjust the first rotational power outputted from the engine.

7. The transmission according to claim 6, wherein the magnetic circuit for the winding includes at least one non-magnetic gap between the winding and the rotor, and the supply current adjustment device adjusts the current to be outputted from the generator by changing the inductance of the winding, the changing of the inductance being implemented by changing magnetic resistance of the at least one non-magnetic gap between the winding and the rotor.

8. The transmission according to claim 7, wherein the magnetic resistance of the at least one non-magnetic gap is highest when the inductance of the winding is set to a highest settable value.

9. The transmission according to claim 6, wherein the magnetic circuit for the winding includes at least one non-magnetic gap, and the supply current adjustment unit adjusts the current to be outputted from the generator by changing the inductance of the winding, the changing of the inductance being implemented by changing magnetic resistance of a non-magnetic gap among the at least one non-magnetic gap, the magnetic resistance of the non-magnetic gap among the at least one non-magnetic gap being highest when the inductance of the winding is set to a highest settable value.

10. The transmission according to claim 1, wherein the magnetic circuit for the winding includes at least one non-magnetic gap between the winding and the rotor, and the supply current adjustment device adjusts the current to be outputted from the generator by changing the inductance of the winding, the changing of the inductance being implemented by changing magnetic resistance of the at least one non-magnetic gap between the winding and the rotor.

11. The transmission according to claim 10, wherein the magnetic resistance of the at least one non-magnetic gap is highest when the inductance of the winding is set to a highest settable value.

12. The transmission according to claim 1, wherein the magnetic circuit for the winding includes at least one non-magnetic gap, and the supply current adjustment unit adjusts the current to be outputted from the generator by changing the inductance of the winding, the changing of the inductance being implemented by changing magnetic resistance of a non-magnetic gap among the at least one non-magnetic gap, the magnetic resistance of the non-magnetic gap among the at least one non-magnetic gap being highest when the inductance of the winding is set to a highest settable value.

13. The transmission according to claim 1, wherein a magnetic flux forms in the rotor and is linked with the winding, the magnetic flux changing, at a first change rate, as the rotor rotates, and the supply current adjustment device adjusts the current to be outputted from the generator by changing the inductance of the winding at a second change rate that is higher than the first change rate.

14. The transmission according to claim 1, wherein the supply current adjustment device causes the portion of the stator core to move relative to the winding while maintaining a position of the stator core relative to the rotor.

15. The transmission according to claim 1, wherein the supply current adjustment device changes the magnetic resistance of the magnetic circuit for the winding, by moving the winding, to thereby adjust the current to be outputted from the generator.

16. The transmission according to claim 1, wherein a linkage flux flows from the permanent magnet of the rotor and is linked with the winding; and the generator further includes a supply voltage configured to change the linkage flux to thereby change an induced voltage of the winding to adjust a voltage outputted from the generator.

17. The transmission according to claim 16, wherein the supply voltage adjustment device changes the linkage flux by moving the permanent magnet relative to the winding.

18. The transmission according to 16, wherein the supply voltage adjustment device includes a voltage supply adjustment mechanism configured to change the linkage flux flowing from the permanent magnet of the rotor and linked with the winding by moving the rotor, to thereby change the induced voltage of the winding to adjust the supply voltage.

19. The transmission according to claim 18, wherein the supply voltage adjustment device further includes a voltage adjustment control device, which is one of
a circuit, and
a processor executing program instructions, configured to control the voltage supply adjustment mechanism to move the rotor in accordance with the torque requirement.

20. The transmission according to claim 1, wherein
the stator core includes a plurality of first stator core parts, each having a facing portion that is opposite to the rotor with a non-magnetic gap therebetween, and a second stator core part, and
the supply current adjustment device changes the magnetic resistance of the magnetic circuit for the winding by moving one, relative to the other, of the plurality of first stator core parts and the second stator core part.

21. The transmission according to claim 20, wherein the moving of the one of the plurality of first stator core parts and the second stator core part relative to the other causes a state of the stator to shift from
a first state in which a width of a non-magnetic gap between each of the plurality of first stator core parts and the second stator core part is smaller than a width of a non-magnetic gap between adjacent ones of the plurality of first stator core parts
to
a second state in which the width of the non-magnetic gap between each of the plurality of first stator core parts and the second stator core part is larger than the width of the non-magnetic gap between adjacent ones of the plurality of first stator core parts.

22. The transmission according to claim 1, wherein the control device includes one of a circuit and a processor executing program instructions, configured to control the engine to adjust the first output rotational power and to control the supply current adjustment device to adjust the inductance of the winding.

23. A vehicle comprising:
the transmission according to claim 1;
the engine; and
a rotational drive device that receives the rotational torque from the transmission.

24. A control device for use in a transmission having
a generator, including a rotor, including a permanent magnet, configured to receive rotational power from an engine,
a stator including a stator core with a winding wound thereon, a magnetic circuit for the winding passing through the stator core, the rotational power causing the rotor and the stator to generate a current for outputting by the generator,
a supply current adjustment device configured to adjust magnetic resistance of the magnetic circuit for the winding, to thereby change an inductance of the winding to adjust the output current, and
a motor configured to be driven by the current outputted from the generator, to thereby output a rotational torque in accordance with a torque requirement,
the control device comprising:
one of a circuit and a processor executing program instructions, configured to
receive the torque requirement, and
control the supply current adjustment device to change the inductance of the winding, in accordance with the received torque requirement, and to thereby switch between a low-resistance state and a high-resistance state, wherein
for each rotation speed of the rotational power, the current generated by the stator is of a first amount and a second amount when the supply current adjustment device is in the low-resistance state and the high-resistance state, respectively, the first amount being larger than the second amount when said each rotation speed is lower than a threshold, and smaller than the second amount when said each rotation speed is higher than the threshold,
the supply current adjustment device changes the magnetic resistance of the magnetic circuit for the winding by moving at least a portion of the stator core relative to the winding, to thereby adjust the current to be outputted from the generator, and
the supply current adjustment device is controlled to, responsive to the receipt of the torque requirement,
switch from the low-resistance state to the high-resistance state when a rotation speed of the received rotational power is higher than the threshold, and
switch from the high-resistance state to the low-resistance state when the rotation speed of the received rotational power is lower than the threshold.

* * * * *